(12) United States Patent
Peeters et al.

(10) Patent No.: US 6,951,904 B1
(45) Date of Patent: Oct. 4, 2005

(54) PROCESS FOR INCREASING THE MELT STRENGTH OF POLYPROPYLENE

(75) Inventors: Gary Peeters, Victoria (AU); Michael Shane O'Shea, Victoria (AU); Graeme Moad, Victoria (AU)

(73) Assignee: Polymers Australia Pty Limited, Victoria (AU)

( * ) Notice: Subject to any disclaimer, the term of this patent is extended or adjusted under 35 U.S.C. 154(b) by 0 days.

(21) Appl. No.: 09/600,363

(22) PCT Filed: Jan. 19, 1999

(86) PCT No.: PCT/AU99/00036

§ 371 (c)(1),
(2), (4) Date: Dec. 11, 2000

(87) PCT Pub. No.: WO99/36466

PCT Pub. Date: Jul. 22, 1999

(30) Foreign Application Priority Data

Jan. 19, 1998 (AU) .............................. PP1392
Jan. 19, 1998 (AU) .............................. PP1393

(51) Int. Cl.[7] ................................. C08F 8/00
(52) U.S. Cl. ................ 525/265; 525/333.8; 525/387
(58) Field of Search ................. 525/265, 387, 525/333.8

(56) References Cited

U.S. PATENT DOCUMENTS

| | | | | |
|---|---|---|---|---|
| 3,166,608 | A | | 1/1965 | Natta et al. ................. 260/878 |
| 3,965,145 | A | | 6/1976 | D'Angelo et al. ....... 260/471 C |
| 4,247,667 | A | * | 1/1981 | Nojiri et al. ................. 525/254 |
| 5,292,811 | A | * | 3/1994 | Murata et al. .............. 525/193 |
| 5,464,907 | A | | 11/1995 | Jelenic et al. ............... 525/303 |
| 5,578,682 | A | | 11/1996 | White ........................ 525/282 |
| 5,589,541 | A | | 12/1996 | Kinoshita et al. ............. 525/66 |
| 6,388,020 | B2 | | 5/2002 | Raetzsch et al. ............ 525/242 |

FOREIGN PATENT DOCUMENTS

| | | |
|---|---|---|
| CH | 440690 | 7/1967 |
| EP | 0009268 | 4/1980 |
| EP | 0384431 | 8/1990 |
| EP | 0506105 | 9/1992 |
| EP | 0528600 | 2/1993 |
| EP | 0601682 | 6/1994 |
| EP | 0787750 | 8/1997 |
| EP | 9927007 | 6/1999 |
| JP | 02283742 | 11/1990 |
| JP | 06240096 | 8/1994 |
| WO | 9749759 | 12/1997 |

OTHER PUBLICATIONS

X. Wang, et al., "Chemical Modification of Polypropylene with Peroxide/Pentaerythritol Tria–crylate by Reactive Extrusion," *Journal of Applied Polymer Science*, vol. 61, 1395–1404 (1996).

M. Lambla, "Reactive Processing of Thermoplastic Polymers," *Comprehensive Polymer Sience*, vol. Suppl. 1, 619–642 (Pergamon, New York) (1992).

A. Hogt, et al., "Modification of polypropylene by organic peroxides," *Reactive Modifiers for Polymers*, 84–132 (Al–Malaika, S. Ed., Chapman & Hall, London) (1996).

E. Borsig, et al., "Efficiency of Chemical Cross–Linking of Polypropylene," *J. Macromol. Sci–Chem.*, A16(2), 513–528 (1981).

I. Chodák, et al, "Crosslinking of polypropylene in the presence of polyfunctional monomers," *Die Angewandte Makromolekulare Chemie*, vol. 69, 107–115 (1978).

Y. Sun, et al., "Melt free–radical grafting of glycidyl methacrylate onto polypropylene," *Die Angewandte Makromolekulare Chemie*, vol. 229, 1–13 (1995).

L. Chen, et al., "Melt Grafting of Glycidyl Methacrylate Onto Polypropylene and Reactive Compatibilization of Rubber Toughened Polypropylene," *Polymer Engineering and Science*, vol. 36(12), 1594–1607 (1996).

S. Lai, et al., "Dow Rheology Index (DRI) for Insite* Technology Polyolefins (ITP): Unique Structure–Processing Relationships," SPE Antec '94 Conference Proceedings, 1815–1815 (1994).

M. Ratzsch et al., *Developments in High Strength i–PP: Technology Properties, Applications and Markets*; ANTEC '99 Conference Proceedings; p. 2071–2075 (1999).

\* cited by examiner

*Primary Examiner*—Bernard Lipman

(57) ABSTRACT

A process for modifying a polypropylene (co)polymer wherein said process comprises melt mixing the polypropylene (co)polymer in the presence of an initiator wherein said initiator is selected from the group defined by formula (1), wherein R is selected from the group consisting of optionally substituted $C_1$ to $C_{18}$ acyl, optionally substituted $C_1$ to $C_{18}$ alkyl, aroyl defined by formula (2), and compounds of formula (3), wherein U, V, X, Y, Z, U', V', X', Y' and Z' are independently selected from the group consisting hydrogen; halogen; C1–C18 alkyl; C1–C18 alkoxy, aryloxy, acyl, acyloxy, aryl, carboxy, alkoxycarbonyl, aryloxycarbonyl, trialkyl silyl, hydroxy, or a moiety of formula (4), and wherein T is alkylene.

19 Claims, No Drawings

PROCESS FOR INCREASING THE MELT STRENGTH OF POLYPROPYLENE

This application is the U.S. national phase of International Application PCT/AU99/00036, filed Jan. 19, 1999.

The press invention relates to polypropylene homopolymers and copolymers. In particular, the present invention relates to a process for increasing the melt strength and/or the extensional melt viscosity of said polymers by melt phase processing.

The melt strength and extensional viscosity of linear or straight chain polymers, such as polypropylene, decreases rapidly with temperature. By contrast, polymers such as low density polyethylene which are highly branched retain relatively high melt strengths and extensional viscosities. It is generally understood that the difference in melt strengths and extensional viscosities is attributable to the presence of long chain branching in polymers such as low density polyethylene. Long chain branching allows a greater degree of chain entanglement.

A number of methods for increasing the melt strength/extensional viscosity of polypropylene and related polymers through the introduction of branching or a limited degree of crosslinking in a process involving reactive extrusion have been proposed and are summarised in a recent paper by Wang et al. (Wang, X., Tzoganakis, C., and Rempel, G. L., *J. Appl. Polym. Sci.*, 1996, 61, 1395). One such process involves the reactive extrusion of polypropylene with a polyfunctional monomer/initiator combination. For example, the use of pentaerythritol triacrylate in combination with 2,5-dimethyl-2,5-di(t-butylperoxy)hexane (DHBP).

White (U.S. Pat. No. 5,578,682) has disclosed the use of various polyunsaturated crosslinking agents (for example, bismeleimide derivatives) in combination with free radical initiators to achieve an increase in the melt strength various polymers.

It is well known that the melt phase processing of polypropylene leads to mechanochemical degradation. The processing of polypropylene in the presence of free radical initiators provides an increased rate of degradation. This controlled degradation of polypropylene is used commercially for the production of controlled rheology resins having reduced polydispersity and reduced die swell (Lambla, M. in *Comprehensive Polymer Science*, Pergamon, New York 1992, vol Suppl. 1, p 619; Hogt, A. H., Meijer, J., Jelinic, J. in Reactive Modifiers for Polymers, Al-Malaika, S. Ed., Chapman & Hall, London, 1996, p 84.). The degradation of polypropylene as described therein results in a lowering of melt strength.

The batch modification of polypropylene to produce crosslinked (insoluble) polypropylene by treatment with peroxides is described by Borsig et al. (Borsig, E., Fiedlerova, A., Lazar, M. *J., Macromol. Sci, Chem.*, 1981, A16, 513). Initiators which produce benzoyloxy radicals or phenyl radicals are described as being more efficient in inducing crosslinking or grafting than those which produce t-butoxy or alkyl radicals. The process requires the use of high levels of peroxide. The use of polyfunctional monomers as coagents to retard degradation and enhance crosslinking is described by Chodak, I.; Fabianova, K.; Borsig, E.; Lazar, M. Agnew. Makromol. Chem., 1978, 69, 107.

DeNicola (EP 384331A2) has disclosed a means to produce a branched propylene polymer material showing a net increase in the weight average molecular weight by solid state modification of predominantly isotactic semi-crystalline linear polypropylene. The process described in EP384331A2 involves blending peroxides with short half lives (eg peroxy dicarbonates) with linear propylene polymer in a mixing vessel at temperatures from 23° C. to 120° C. in an inert atmosphere and continuing to mix for a period of time until the peroxide decomposes and polymer fragmentation and branching occurs without significant gelation of the polymer. DeNicola states that at temperatures greater than 120° C. no branching or melt strength enhancement is achieved.

U.S. Pat. No. 5,464,907 teaches that certain unsaturated maleate or itaconate derived peroxides may be used to induce grafting in polypropylene and α-olefin copolymers. They report that use of other peroxides generally results in chain degradation.

Polypropylene is also known to undergo substantial degradation during melt phase grafting of monofunctional monomers, for example maleic anhydride and glycidyl methacrylate. It has also been reported that the degradation that accompanies grafting of these monomers to polypropylene may be reduced by the addition of relatively high concentrations of certain comonomers including styrene (see, for example Sun, Y.-J., Hu, G.-H., and Lambla, M., *Angew. Makromol. Chem*, 1995, 229, 1; Chen, L-F., Wong, B. and Baker, W. E. *Polym. Eng. Sci*. 1996, 36, 1594.) Sun et al. report that there is degradation (as indicated by an overall decrease in molecular weight) when styrene alone is grafted onto polypropylene even when a relatively high concentration is used (4 moles/100 g PP). Either 2,5-dimethyl-2,5-(t-butylperoxy)hex-3-yne or 2,5-dimethyl-2,5 (t-butylperoxy-hexane(DHBP) was used as the initiator in these experiments.

We have found that melt mixing polypropylene homopolymer or ethylene-polypropylene copolymer in the presence of a suitable initiator provides one or more of the following: increased melt strength; increased extensional viscosity; increased molecular weight; and broadened molecular weight distribution.

According to the present invention there is provided a process for modifying a polypropylene (co)polymer wherein said process comprises melt mixing the polypropylene (co) polymer in the presence of an initiator wherein said initiator is selected from the group defined by formula 1:

Formula 1

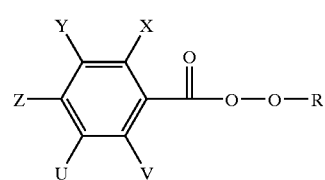

wherein R is selected from the group consisting of optionally substituted $C_1$ to $C_{18}$ acyl, optionally substituted $C_1$ to $C_{18}$ alkyl, aroyl defined by formula 2, Formula 2

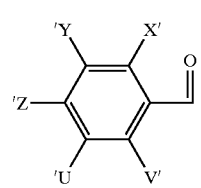

and groups of formula 3,

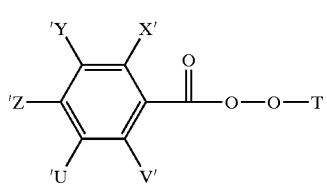

Formula 3 wherein U, V, X, Y, Z, U', V', X', Y' and Z' are independently selected from the group consisting hydrogen, halogen, C1–C18 alkyl, C1–C18 alkoxy, aryloxy, acyl, acyloxy, aryl, carboxy, alkoxycarbonyl, aryloxycarbonyl, trialkyl silyl, hydroxy, or a moiety of formula 4,

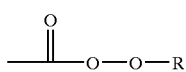

Formula 4 and wherein T is alkylene.

Advantageously the thus formed modified polypropylene may be obtained without the associated production of significant and detrimental amounts of gels.

Polymers suitable for use in the present invention include a wide variety of polypropylene homopolymers, copolymers and blends containing one or more polypropylene homopolymers and/or copolymers.

Suitable polypropylene homopolymers include isotactic polypropylene, atactic polypropylene and syndiotactic polypropylene. Commercial isotactic polypropylene having a proportion of meso/dyads of greater than 90% is preferably used in the process of the present invention. Isotactic polypropylene is a semi-crystalline polymer having a number of properties which have made it one of the most widely used commercial polymers. These properties include heat resistance, stress cracking resistance, chemical resistance, toughness, and low manufacturing costs. However, the melt strength of isotactic polypropylene as measured directly by extensional viscosity or use of a commercial melt strength tester or indirectly by more qualitative measures such as drop time or die swell ratio is relatively low. This relatively low melt strength limits the use of polypropylene in applications such as foam extrusion, thermoforming and film blowing. In order to use polypropylene in such applications it is necessary to employ sophisticated processing equipment. The present invention now permits this already widely used commercial polymer to be used in an even wider range of applications.

Polypropylene copolymers include copolymers of propylene and other monomers with such other monomers being present preferably in amounts of up to 10% wt/wt. A preferred comonomer is ethylene.

The present invention is also applicable to other polymers comprising α-olefin monomers. It is preferable that any such α-olefins are present in the polymer to be modified in amounts in excess of 90% wt/wt. α-olefins include propene, 1-butene, 1-pentene and 1-hexene.

The initiators for use in the present invention may be selected from the group defined by formula 1.

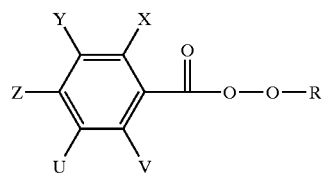

Formula 1 wherein R is selected from the group consisting of optionally substituted $C_1$ to $C_{18}$ acyl, optionally substituted $C_1$ to $C_{18}$ alkyl, aroyl defined by formula 2,

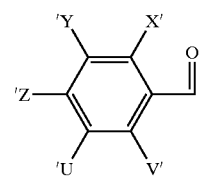

Formula 2 and groups of formula 3,

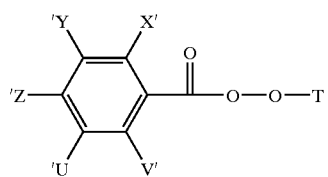

Formula 3 wherein U, V, X, Y, Z, U', V', X', Y' and Z' are independently selected from the group consisting hydrogen, halogen, C1–C18 alkyl, C1–C18 alkoxy, aryloxy, acyl, acyloxy, aryl, carboxy, alkoxycarbonyl, aryloxycarbonyl, trialkyl silyl, hydroxy, or a moiety of formula 4,

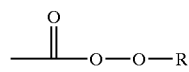

Formula 4 and wherein T is alkylene.

The alkyl, including acyl and alkoxy, groups included in the initiators of formula 1 may include hetero atoms within the carbon chain (eg polyalkylene oxide) and may be branched or unbranched and may be substituted with one or more groups such as with alkyl, aryl, alkoxy or halogen substituents.

Without wishing to be bound by theory, it is believed that the aroyloxy radical of formula 5

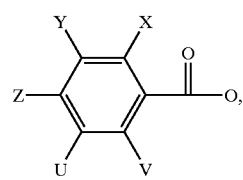

Formula 5 where U, V, X, Y and Z are as hereinabove defined, provide the surprising increase in melt strength. Other compounds which generate these aroyloxy radicals may also be used in the present invention.

A preferred class of initiators of formula 1 are diaroyl peroxides of formula 6.

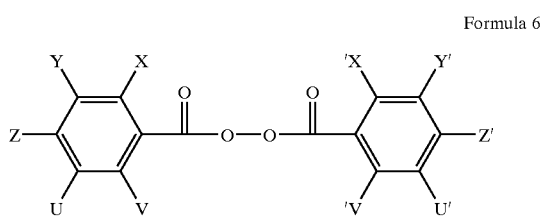

Formula 6 where X, Y, Z, U, V, X', Y', Z', U', V' are independently selected from the group consisting of hydrogen and $C_1$–$C_{18}$ alkyl where at least one of X, Y, Z, U, V and X', Y', Z', U', V' are not hydrogen.

Diaryl peroxides of formula 6 include Dibenzoyl peroxide, o,o'-Bis(methylbenzoyl) peroxide, p,p'-Bis(methylbenzoyl) peroxide, M,M'-Bis(methylbenzoyl) peroxide, o,m'-Bis(methylbenzoyl) peroxide, o,p'-Bis(methylbenzoyl) peroxide, m,p'-Bis(methylbenzoyl) peroxide, Bis(ethylbenzoyl) peroxide (all isomers), Bis(propylbenzoyl) peroxide (all isomers), Bis(butylbenzoyl) peroxide (all isomers), Bis(pentylbenzoyl) peroxide (all isomers), Bis(hexylbenzoyl) peroxide (all isomers), Bis(heptylbenzoyl) peroxide (all isomers), Bis(octylbenzoyl) peroxide (all isomers), Bis(nonylbenzoyl) peroxide (all isomers), Bis(methoxybenzoyl) peroxide (all isomers), Bis(ethoxybenzoyl) peroxide (all isomers), Bis(propoxybenzoyl) peroxide (all isomers), Bis(butoxybenzoyl) peroxide (all isomers), Bis(pentoxybenzoyl) peroxide (all isomers), Bis(hexyloxybenzoyl) peroxide (all isomers), Bis(heptyloxybenzoyl) peroxide (all isomers), Bis(octyloxybenzoyl) peroxide (all isomers), Bis(nonyloxybenzoyl) peroxide (all isomers), Bis(chlorobenzoyl) peroxide (all isomers), Bis(fluorobenzoyl) peroxide (all isomers), Bis(bromobenzoyl) peroxide (all isomers), Bis(dimethylbenzoyl) peroxide (all isomers), Bis(trimethylbenzoyl) peroxide (all isomers), Bis(tert-butylbenzoyl)peroxide (all isomers), Bis(di-tert-butylbenzoyl)peroxide (all isomers), Bis(tertbutoxybenzoyl) peroxide (all isomers), Bis(ditrimethylsilylbenzoyl) peroxide (all isomers), Bis(heptafluoropropylbenzoyl) peroxide (all isomers), Bis(2,6-dimethyl-4-trimethysilyl benzoyl) peroxide and isomers, 2,2'(dioxydicarbonyl) bis—Benzoic acid dibutyl ester where the term "all isomers" refers to any variation in the position of the ring substituent as well as the structure of the substituent itself i.e. for propyl; n-propyl and isopropyl.

Examples of aromatic peresters of formula 1 include the following: tert-butyl perbenzoate, tert-butyl (methyl)perbenzoate (all isomers), tert-butyl (ethyl)perbenzoate (all isomers), tert-butyl (octyl)perbenzoate (all isomers), tert-butyl (nonyl)perbenzoate (all isomers), tert-amyl perbenzoate, tert-amyl (methyl)perbenzoate (all isomers), tert-amyl (ethyl)perbenzoate (all isomers), tert-amyl (octyl)perbenzoate (all isomers), tert-amyl (nonyl)perbenzoate (all isomers), tert-amyl (methoxy)perbenzoate (all isomers), tert-amyl (octyloxy)perbenzoate (all isomers), tert-amyl (nonyloxy)perbenzoate (all isomers), 2-ethylhexyl perbenzoate, 2-ethylhexyl (methyl)perbenzoate (all isomers), 2-ethylhexyl (ethyl)perbenzoate (all isomers), 2-ethylhexyl (octyl)perbenzoate (all isomers), 2-ethylhexyl (nonyl)perbenzoate (all isomers), 2-ethylhexyl (methoxy)perbenzoate (all isomers), 2-ethylhexyl (ethoxy)perbenzoate (all isomers), 2-ethylhexyl (octyloxy)perbenzoate (all isomers), 2-ethylhexyl (nonyloxy)perbenzoate (all isomers)

The initiators for use in the present invention also include compounds of formula I where at least one of U, V, X, Y, Z, U', V', X' Y' and Z' is a moiety of formula 4 where R is as defined above. Preferably there is no more than one moiety of formula 4 per aromatic ring. Such initiators are di or higher functional peroxides and may include polymeric peroxides such as Bis (tertbutylmonoperoxy phthaloyl) diperoxy terephthalate, Bis (tertamylmonoperoxy phthaloyl) diperoxy terephthalate diacetyl phthaloyl diperoxide, dibenzoyl phthaloyl diperoxide, bis(4 methylbenzoyl) phthaloyl diperoxide, diacetyl terephthaloyl di peroxide, dibenzoyl terephthaloyl diperoxide, Poly[dioxycarbonyldioxy(1,1,4,4-tetramethyl-1,4-butanediyl)] peroxide.

It is described that the initiators are selected such that it has an appropriate decomposition temperature (half life), solubility, and reactivity and such that the groups R, T, X Y, Z, U, V, X', Y', Z', U', V' give no adverse reaction under the conditions of the process. Preferred peroxides will have a 0.1 hour half life in the range 100–170° C.

The amount of initiator used in the process of the present invention should be an effective amount to achieve the desired increase in melt strength. Melt strength is considered in the art to be an indication of long-chain branching in polyolefins. It is preferable in the process of the present invention that long-chain branching predominates over crosslinking in the reaction between the initiator and the polypropylene (co)polymer. Crosslinking of the polypropylene (co)polymer may result in the formation of gels which disrupt the appearance of the polypropylene (co)polymer. In the process of the present invention it is desirable to control the degree and distribution of crosslinking and keep the level of crosslinking as uniform and as low as necessary to produce the desired effects. The amount of crosslinking which occurs in the polypropylene (co)polymer is dependant upon the amount of initiator melt mixed with the polypropylene (co)polymer. The amount of crosslinking is also dependent upon the degree of mixing as any regions high in initiator concentration will result in excessive localised crosslinking and the formation of gels. It is desirable that good distributive and dispersive mixing be employed to promote even distribution of the initiator in the polypropylene (co)polymer so as to minimise the variation in initiator concentration throughout the polypropylene (co)polymer and reduce the likelihood of the formation of gels.

Preferably the initiator will be present in the range of from 0.004 to 0.25 moles of initiator per kg of the polypropylene homopolymer or copolymer (polypropylene (co)polymer). The mole preferred range being from 0.006 to 0.10 moles of initiator per kg. of the polypropylene (co)polymer and even more preferred range being from 0.01 to 0.05 moles of initiator per kg of the polypropylene (co)polymer.

The initiator is preferably introduced into the polymer melt directly, either neat (as a powder or a liquid), dispersed or dissolved in a suitable medium (for example, dissolved in 2-butanone) or adsorbed on polymer pellets or powder which are added as a masterbatch. It is desirable that the initiator is rapidly mixed with the polymer melt at a rate in keeping with the half life of the initiator at the processing temperature of the polypropylene (co)polymer.

The initiator may be added either alone, or along with the polypropylene (co)polymer, or with any other polymer, additive or filler, so that the polymer melts and mixes with the initiator as it is decomposing. When the initiator is fed to the main feed throat of the extruder it is preferred to have a barrel temperature which is relatively low in the region adjacent to the main feed throat and increases towards the die to prevent premature decomposition of the peroxide.

Preferably the initiators for use in the present invention are selected from the group consisting of Dibenzoyl peroxide, o,o'-Bis(methylbenzoyl) peroxide, p,p'-Bis (methylbenzoyl) peroxide, o,o'-Bis(methylbenzoyl) peroxide, o,m'-Bis(methylbenzoyl) peroxide, o,p'-Bis (methylbenzoyl) peroxide, m,p'-Bis(methylbenzoyl) peroxide, Bis(ethylbenzoyl) peroxide (all isomers), Bis (propylbenzoyl) peroxide (all isomers), Bis(butylbenzoyl) peroxide (all isomers), Bis(pentylbenzoyl) peroxide (all isomers), Bis(hexylbenzoyl) peroxide (all isomers), Bis (heptylbenzoyl) peroxide (all isomers), Bis(octylbenzoyl) peroxide (all isomers), Bis(nonylbenzoyl) peroxide (all isomers), Bis(methoxybenzoyl) peroxide (all isomers), Bis (ethoxybenzoyl) peroxide (all isomers), Bis (propoxybenzoyl) peroxide (all isomers), Bis (butoxybenzoyl) peroxide (all isomers), Bis (pentoxybenzoyl) peroxide (all isomers), Bis (hexyloxybenzoyl) peroxide (all isomers), Bis (heptyloxybenzoyl) peroxide (all isomers), Bis (octyloxybenzoyl) peroxide (all isomers), Bis (nonyloxybenzoyl) peroxide (all isomers), Bis (chlorobenzoyl) peroxide (all isomers), Bis(fluorobenzoyl) peroxide (all isomers), Bis(bromobenzoyl) peroxide (all isomers), Bis(dimethylbenzoyl) peroxide (all isomers), Bis (trimethylbenzoyl) peroxide (all isomers), Bis(tert-butylbenzoyl)peroxide (all isomers), Bis(di-tert-butylbenzoyl)peroxide (all isomers), Bis(tertbutoxybenzoyl) peroxide (all isomers), Bis(ditrimethylsilylbenzoyl) peroxide (all isomers), Bis(heptafluoropropylbenzoyl) peroxide (all isomers), Bis(2,4-dimethyl-6-trimethysilyl benzoyl) peroxide and isomers tert-amyl perbenzoate, tert-amyl (methyl)perbenzoate (all isomers), tert-amyl (ethyl) perbenzoate (all isomers), tert-amyl (octyl)perbenzoate (all isomers), tert-amyl (nonyl)perbenzoate (all isomers), tert-amyl (methoxy)perbenzoate (all isomers), tert-amyl (octyloxy)perbenzoate (all isomers), tert-amyl (nonyloxy) perbenzoate (all isomers), Bis (tertamylmonoperoxy phthaloyl) diperoxy terephthalate, diacetyl phthaloyl diperoxide, dibenzoyl phthaloyl diperoxide, bis(4-methylbenzoyl) phthaloyl diperoxide, diacetyl terephthaloyl di peroxide and dibenzoyl terephthaloyl diperoxide.

More preferably the initiators are selected from the group consisting of dibenzoyl peroxide, o,o'-Bis(methylbenzoyl) peroxide, p,p'-Bis(methylbenzoyl) peroxide, M,M'-Bis (methylbenzoyl) peroxide, o,m'-Bis(methylbenzoyl) peroxide, o,p'-Bis(methylbenzoyl) peroxide, m,p'-Bis (methylbenzoyl) peroxide.

The initiators may optionally be used in combination with one or more monomers.

Preferably the one or more monomers are selected from the group consisting of monene monomer. It will be understood by those skilled in the art that by the term "monoene monomer" it is meant a monomer having a single reactive double bond.

The preferred monoene monomer(s) or mixtures thereof include vinyl monomers of structure $CH_2=CHX$ where X is chosen so as to confer the desired reactivity and solubility. More preferred monomers include styrene. The amount of monomer will preferably be up to 5 times the total moles of initiator added to the polypropylene (co)polymer. The most preferred range being 1 to 4 times the total moles of initiator added to the polypropylene (co)polymer.

The monomer may be added with the polypropylene (co)polymer or it can be added prior to the initiator, with the initiator or subsequent to the initiator. However it is preferred to have the monomer mixed and dispersed into the polymer melt before the initiator has substantially decomposed. The monomer is preferably introduced into the polymer melt directly, either neat (as a powder or a liquid), dispersed or dissolved in a suitable medium (for example, dissolved in 2-butanone) or adsorbed on polymer pellets or powder which are added as a Preferred initiators for use in combination with monomers include Dibenzoyl peroxide, o,o'-Bis(methylbenzoyl) peroxide, p,p'-Bis(methylbenzoyl) peroxide, M,M'-Bis (methylbenzoyl) peroxide, o,m'-Bis(methylbenzoyl) peroxide, o,p'-Bis(methylbenzoyl) peroxide, m,p'-Bis (methylbenzoyl) peroxide, Bis(ethylbenzoyl) peroxide (all isomers), Bis(propylbenzoyl) peroxide (all isomers), Bis (butylbenzoyl) peroxide (all isomers), Bis(pentylbenzoyl) peroxide (all isomers), Bis(hexylbenzoyl) peroxide (all isomers), Bis(heptylbenzoyl) peroxide (all isomers), Bis (octylbenzoyl) peroxide (all isomers), Bis(nonylbenzoyl) peroxide (all isomers), Bis(methoxybenzoyl) peroxide (all isomers), Bis(ethoxybenzoyl) peroxide (all isomers), Bis (propoxybenzoyl) peroxide (all isomers), Bis (butoxybenzoyl) peroxide (all isomers), Bis (pentoxybenzoyl) peroxide (all isomers), Bis (hexyloxybenzoyl) peroxide (all isomers), Bis (heptyloxybenzoyl) peroxide (all isomers), Bis (octyloxybenzoyl) peroxide (all isomers), Bis (nonyloxybenzoyl) peroxide (all isomers), Bis (chlorobenzoyl) peroxide (all isomers), Bis(fluorobenzoyl) peroxide (all isomers), Bis(bromobenzoyl) peroxide (all isomers), Bis(dimethylbenzoyl) peroxide (all isomers), Bis (trimethylbenzoyl) peroxide (all isomers), Bis(tert-butylbenzoyl)peroxide (all isomers), Bis(di-tert-butylbenzoyl)peroxide (all isomers), Bis(tert-butoxybenzoyl)peroxide (all isomers), Bis (ditrimethylsilylbenzoyl) peroxide (all isomers), Bis (heptafluoropropylbenzoyl) peroxide (all isomers), Bis(2,4-dimethyl-6-trimethylsilyl benzoyl) peroxide and isomers, 2,2'(dioxydicarbonyl) bis—Benzoic acid dibutyl ester, tert-butyl perbenzoate, tert-butyl (methyl)perbenzoate (all isomers), tert-butyl (ethyl)perbenzoate (all isomers), tert-butyl (octyl)perbenzoate (all isomers), tert-butyl (nonyl) perbenzoate (all isomers), tert-amyl perbenzoate, tert-amyl (methyl)perbenzoate (all isomers), tert-amyl (ethyl) perbenzoate (all isomers), tert-amyl (octyl)perbenzoate (all isomers), tert-amyl (nonyl)perbenzoate (all isomers), tert-amyl (methoxy)perbenzoate (all isomers), tert-amyl (octyloxy)perbenzoate (all isomers), tert-amyl (nonyloxy) perbenzoate (all isomers), 2-ethylhexyl perbenzoate, 2-ethylhexyl (methyl)perbenzoate (all isomers), 2-ethylhexyl (ethyl)perbenzoate (all isomers), 2-ethylhexyl (octyl)perbenzoate (all isomers), 2-ethylhexyl (nonyl) perbenzoate (all isomers), 2-ethylhexyl (methoxy) perbenzoate (all isomers), 2-ethylhexyl (ethoxy)perbenzoate (all isomers), 2-ethylhexyl (octyloxy)perbenzoate (all isomers), 2-ethylhexyl (nonyloxy)perbenzoate (all isomers), Bis (tertbutylmonoperoxy phthaloyl) diperoxy terephthalate, Bis (tertamylmonoperoxy phthaloyl) diperoxy terephthalate diacetyl phthaloyl diperoxide, dibenzoyl phthaloyl diperoxide, bis(4 methylbenzoyl) phthaloyl diperoxide, diacetyl terephthaloyl di peroxide, dibenzoyl terephthaloyl diperoxide and Poly[dioxycarbonyldioxy(1,1,4,4-tetramethyl-1,4-butanediyl)] peroxide.

Advantageously initiators may be selected to avoid undesirable by-products. In certain applications, it may be desirable to avoid the use of initiators which generate benzene. For example di toluoyl peroxides (bis methyl benzoyl peroxides) may be used in preference to dibenzoyl peroxide.

The processability and other properties of the product may be improved by a chain scission step following the initial polymer modification step. This may be carried out by:

a) adding one or more additional initiators with or subsequent to the first initiator addition;
b) the use of high shear mixing;
c) the use of high temperatures;
d) the use combination is of one or more of (a)–(c) above.

This additional step in the production of a polymer enables tailoring the properties of the product to the requirements of the desired application. For example, by this two stage process it is possible to produce materials with similar melt viscosity to the base polymer but a substantially increased melt strength. Use of the single stage process generally provides both an increase in melt strength and an increase in melt viscosity (see examples)

One or more additional initiators may be added to the polypropylene (co)polymer during the modification process either with or subsequent to the initiator and monomer addition. The additional initiator is typical added to give chain scission of the polypropylene (co)polymer so as to decrease the melt viscosity and improve the processability of the modified polypropylene (co)polymer. The additional initiator should be introduced to the polymer melt after the first initiator or have a sufficiently long half-life relative to the first initiator such that its decomposition can be staged to occur after the initial polymer modification process. In some instances a polypropylene (co)polymer modified in accordance with the present invention may have a MFI<1 g/10 min. With use of the additional initiator an MFI>1 g/10 min may be achieved. The additional initiator may be selected from the group consisting of 2,5-dimethyl-2,5-di(t-butylperoxy)hexane (DHBP), dicumyl peroxide (DCP), t-butyl peroxy-2-ethylhexonate(TBEH), and dilauryl peroxide (DLP) or any other peroxide which may result in the overall chain scission of the polypropylene (co)polymer during melt processing. For example in the absence of the monoene monomers, t-butyl peroxybenzoate or other non-preferred initiators for use in the presence of the monomer may be preferably added as the additional initiator. While the improvement in processability through chain scission normally results in some decrease in the melt strength/extensional viscosity of the modified polypropylene (co) polymer, the melt strength/extensional viscosity may still be acceptable, and improved over the unmodified polypropylene (co)polymer.

It is possible to combine the process of the present invention with other processes of polymer modification or with, for example, the addition of fillers, additives or stabilisers, or blending with other polymers.

In the process of the present invention the polypropylene (co)polymer is melt mixed in the presence of initiator and optionally a monomer. Melt mixing may be carried out by any convenient means capable of mixing the polypropylene (co)polymer at temperatures above the melting point of the polypropylene (co)polymer.

Suitable apparatus for melt mixing the polypropylene (co)polymer include continuous and batch mixers. Suitable mixing equipment includes extruders such as single screw and twin screw extruders, static mixers, cavity transfer mixers and combinations of two or more thereof. It is preferred that the melt mixing is conducted in either a co- or counter-rotating twin screw extruder.

The barrel set temperatures are preferably in the range 80–280° C. Typical melt temperatures are in the range 170–290° C.

In order to optimise the melt extensional viscosity, the preferred melt temperatures are in the range 160° C. to 220° C. This rage provides optimal properties whilst minimising the amount of chain scission which occurs during processing. However, in some cases it may be desirable to use higher temperatures such as in the venting/discharge sections of single screw or twin screw extruders or to induce some chain scission in order to decrease the molecular weight of the modified polypropylene (co)polymer and improve the processability of the modified polypropylene (co)polymer.

Typically, the die temperatures are in the range 180–290° C.

Preferably the extrusion conditions are adjusted so that the polypropylene (co)polymer, initiator/monomer mixture are conveyed as quickly as possible into the melting/mixing zone to maximise the melt phase reaction (eg for twin screw extruders—high throughput rates, higher screw seeds under starve fed conditions). It is more preferred that the additives are added to and mixed with molten polypropylene (co) polymer to further enhance the melt phase reaction. Preferably residence times in the range of from 10 seconds to 5 minutes are selected depending upon the temperature profile, throughput rate and initiator levels. More preferred residence times are in the range of from 15 seconds to 120 seconds.

Vacuum venting can be applied to remove volatile by-products, solvents and/or excess monomer.

While not wishing to be limited by theory, it is believed that the effectiveness of the present invention is determined by three factors:
(a) The rate and specificity of the reaction of the aroyloxy or the derived phenyl radicals or substituted phenyl radicals with polypropylene, and the monomer if present. It is believed that the aroyloxy, phenyl or substituted aroyloxy or phenyl radicals show less specificity for abstraction of tertiary vs. secondary or primary hydrogens than do, for example, alkoxy or alkyl radicals.
(b) The initiator half-life. Use of an initiator with a short initiator half-life will generate a locally high concentration of radicals thus increasing the likelihood of radical combination events.
(c) The solubility characteristics of the initiator in the polymer melt.

Without wishing to be bound by theory, peroxides that generate aroyloxy or aryl radicals (for example benzoyloxy, p-toluouloxy) are preferred over those that generate alkoxy radicals (for example, t-butoxy radical, cumyloxy radical). It is believed and supported in the literature that the latter class of peroxides promote chain scission under the melt mixing conditions. While not wishing to be bound by the mechanism, it is believed that this effect is due to the specificity shown by the alkoxy radicals as opposed to the aroyloxy or aryl radicals generated by the peroxides of structure 1. Furthermore we believe that peroxides which generate both alkoxy and aroyloxy or aryl radicals (for example, t-butyl perbenzoate) show intermediate behaviour. It is believed that they promote less chain scission than peroxides which generate only alkoxy radicals (for example, dialkyl peroxides) when used alone and can be used to advantage in systems where a monomer coagent is employed. Preferred peresters are thus those which generate alkoxy radicals which are not active in hydrogen abstraction (for example t-amyl perbenzoate).

Similarly, it is believed, without wishing to be bound by theory, that the effectiveness of the monomer is determined by:
(a) The solubility of the monomer in the polymer melt. For example, styrene is known to be soluble in molten polypropylene.
(b) The reactivity of the monomer towards polypropylene derived radicals.

(c) The propensity for the radical formed by addition of monomer to give combination or addition (which leads to branch or crosslink formation) vs. disproportionation or hydrogen abstraction. It is known that the benzylic radicals give predominantly combination and have low (with relation to other radicals) tendency to abstract hydrogen.

Other initiators and monomers that meet the above criteria may also be used to advantage in the present invention.

Surprisingly, the process of the present invention results in a polypropylene (co)polymer with substantially increased melt strength. We have found that it is possible with the present invention to obtain a polypropylene (co)polymer which has a melt strength at least 25% greater than the melt strength of the base polymer. We have also found that it is possible to obtain an increase in melt strength of greater than 100% for a number of the polypropylene (co)polymers produced in accordance with the process of the present invention. Increases in melt strength were assessed using a Gottfert-Rheotens melt strength tester operated with a roller acceleration of 1.2 cm/sec$^2$ measuring the melt strength of a 2 mm strand of molten polypropylene (co)polymer (melt temperature of 210° C.) which is fed to the Gottfert tester at ~4 g/min.

In a further aspect of the present invention there is provided a modified polypropylene (co)polymer produced according to the process described herein, wherein said modified polypropylene (co)polymer preferably has a melt strength at least 25%, and more preferably at least 100%, greater than the unmodified polypropylene (co)polymer.

The polypropylene (co)polymers produced according to the process of the present invention also may provide a significant increase in long-chain branching. Long-chain branching may be assessed by the Dow Rheology Index. Advantageously, the modified polypropylene (co)polymers may demonstrate a Dow Rheology Index (DRI) of greater than 1, preferably at least 2 and most preferably greater than 50.

The process of the present invention may also be used to increase the melt elasticity of a polypropylene (co)polymer.

Advantageously, the process of the present invention also provides a means to alter the molecular weight, molecular weight distribution and/or degree and length of branching of polypropylene, ethylene-propylene copolymers, and analogous α-olefin copolymers with or without altering the melt strength of said polymers by melt processing.

The process of the present invention may provide a means to generally increase the molecular weight and broaden the molecular weight distribution and/or introduce branching of the polypropylene (co)polymer. This will not always equate to significant increases in the melt strength or extensional viscosity of the polymer that is being modified eg modification of a lower molecular weight polymer to broaden the molecular weight and/or induce shorter branches. Such a product may not necessarily demonstrate a high melt strength, but may demonstrate other desirable properties, for example improved filler uptake, mechanical properties, surface properties, thermal and morphological properties.

The modified polypropylene (co)polymer produced by the process of the present invention may be used either neat or blended with another polymer or other additives to provide the desired balance of properties in the polymer blend.

The modified polypropylene (co)polymers and blends may be used in a wide variety of applications including thermoforming, blow moulding, tube or pipe extrusion, blown films, foams and extrusion coating.

The present invention may also be used in the recycling of waste polypropylene or materials containing waste polypropylene.

The increased melt strength of the modified polypropylene (co)polymers renders these (co)polymers more suitable for use in thermoforming applications. The modified polypropylene (co)polymers may be used to thermoform containers such as margarine tubs. The benefits of this invention include that the polypropylene (co)polymers and blends containing same provide a wider temperature processing window than conventional isotactic polypropylene. The modified polypropylene (co)polymers may also be used in large part thermoforming such as in the production of refrigerator liners and the like where conventional isotactic polypropylene is unsuitable.

The modified polypropylene (co)polymers produced in accordance with the present invention are suitable for blow moulding and we have found that they can be more readily blow moulded into containers. Furthermore, the increased melt strength makes it possible to produce large blow moulded parts through the use of the high melt strength modified polypropylene (co)polymer. Thus components currently made by rotational moulding may now be produced by blow moulding using the modified polypropylene (co)polymer of the present invention.

Profile extrusion for example tube or pipe extrusion, using the modified polypropylene (co)polymer has been found to produce a more consistent product than conventional isotactic polypropylene.

Blown films made of polypropylene are generally blown downwards using relatively expensive equipment. The modified polypropylene (co)polymers of the present invention have sufficient melt strength for them to be able them to be blown upwardly using conventional polyethylene type film blowing equipment which is less expensive and generally more convenient to operate. Advantageously the modified polypropylene (co)polymers of the present invention may be used in the production of blown films.

The modified polypropylene (co)polymers of the present invention may also be foamed with a wider processing window than for conventional polypropylene. Either a physical or chemical blowing agent may be used. It is preferred to use carbon dioxide as a physical blowing agent to produce foams having a fine closed cell structure. Foamed pellets may be subsequently moulded to form components for use in a variety of applications such as automotive door trims, rooflinings, dash boards, bumpers and the like. Applications such as in foamed packaging are also possible, including thermoformed containers, insulating cups and the like.

Waste polypropylene or waste steams containing a significant proportion of polypropylene are presently difficult to recycle as conventionally a high degree of chain scission results from the recycling process. The process of the present invention may be used to upgrade recycled streams containing polypropylene by increasing the overall mechanical properties of the recycled polypropylene by the addition of initiator and monomer in accordance with the present invention.

The present invention will now be described with reference to the following non-limiting examples. Described hereunder are the measurement techniques used in the examples and a full description of the process conditions employed. Comparative Examples are labelled CE-n.

Melt Strength Measurement

Melt steps were measured on a "Rheotens" Melt Strength Tester, Type 010.1, supplied by Gottfert Werkstoff-Prufmaschinen Gmbh of Buchen, Germany. This test involves drawing an extruded strand of polymer vertically into the nip between two counter-rotating nip rollers. The strand was extruded using a Brabender Plasticord single screw extruder of screw diameter 19 mm and length to diameter ratio (L/D) of 25. The extrudate exited via a right angle capillary die (2 mm diameter). The temperature profile used was uniform along the length of the barrel of the extruder and the die and was set at 190° C. The nip rollers are mounted on a balance arm which allows the force in the drawing strand to be measured. The velocity of the nip rolls is increased at a uniform acceleration rate. As the test proceeds, the force increases until eventually the strand breaks. The force at breakage is termed the "melt strength".

While there is no internationally-established standard set of test requirements for melt strength testing, comparative melt strength values obtained under the given set of test conditions provide a quantitative determination of the increase in melt strength used in the patent. The test conditions used were: die temperature 190° C., extruder output rate ~4 g/min, acceleration rate 1.2 cm/sec$^2$, draw distance 210 mm, matt finish steel rollers.

Dow Rheology Index

The Dow Rheology Index (DRI) is believed in the art to be a measure of the long chain branching in a polymer. It is expressed as the deviation of a viscosity parameter obtained from shear rheology measurements on a "branched" polymer compared with that for a linear polymer. The branched polymers have lower values of the viscosity parameter than the linear polymers (for a given relaxation parameter). The parameters are obtained by fitting the Cross model to the shear viscosity flow curves. The DRI method has been described by Lai, Plumley, Butler, Knight and Kao in a paper in SPE ANTEC '94 Conference Proceedings (pp1814–1818)—"Dow Rheology Index (DRI) for Insite Technology Polyolefins (ITP): Unique Structure-Processing Relationships".

Dynamic Rheology Tests

The dynamic rheology tests were performed on a Rheometrics Dynamic Stress Rheometer SR200. Test conditions were: parallel plates, temperature 190° C., frequency range 0.01 to 100 rad/sec, and 3–4% strain, in a nitrogen atmosphere to prevent degradation. G' is the storage modulus representing the elasticity of the polymer melt, G" is the loss modulus which represents the viscous component of the deformation. The polydispersity index is 10 to power 5 divided by the crossover modulus, which is the value of G'=G" when the G' and G" curves crossover—it is believed to be a measure of MWD. The higher G', the greater elasticity in the polymer and the higher the MW.

MFI

Melt flow indexes (MFI) were measured a 230° C. with a 2.16 kg load according to ASTM 1238.

Drop Times

The drop times were determined by measuring the time taken for the polypropylene strand (cut at the die face) to drop from the die of the extruder to the floor. The die of the JSW twin screw extruder was 1140 mm above the floor. The drop time test combines the effects of melt viscosity, extensional viscosity, chain entanglement (as shown by die swell), and elasticity (as shown by the tendency resist neck formation). Higher melt viscosity polypropylene polymers had drop times which incorporated some additional effect due to prolonged cooling of the slower moving (falling) molten strand.

GPC

GPC molecular weights were determined using a Waters 150C high temperature GPC unit. 1,2,4-trichlorobenzene was used as the solvent, eluting through two Styragel HT6E linear columns. The oven temperature was set at 140° C. and the pump flow rate was 1.0 ml/min.

Calibration was performed using narrow polydispersity polystyrene standards. All molecular weights quoted as polystyrene equivalents.

Mn=number average molecular weight

Mw=weight average molecular weight

Mz=viscosity average molecular weight

Mp=peak molecular weight

Twin Screw Extruder

The twin screw extruder used in the examples was a JSW TEX-30 with a 30 mm screw diameter and an overall L/D of 42. The extruder was operated in either co-rotating (intermeshing self wiping) or counter rotating (intermeshing non-self wiping) modes with a throughput rate of between 5 and 20 kg/hr and screw speeds of between 100 and 400 rpm as specified in Table 1. The melt temperature and pressures were monitored at three points along the barrel and in the die.

TABLE 1

Operating conditions

| Conditions | Screw Speed (rpm) | Feed Rate (kg/hr) | Temperature Profile (° C.) |
|---|---|---|---|
| A | 265 | 20 | 150° C., 175° C. (by 10) |
| B | 265 | 20 | 180° C., 200° C. (by 3), 220° C. (by 7) |
| C | 150 | 5 | 120° C., 130° C. (by 4), 180° C. (by 6) |
| D | 265 | 20 | 140° C., 150° C. (by 10) |
| E | 265 | 20 | 180° C., 20D° C. (by 4), 230° C., 240° C., 250° C., 260° C., 270° C., 280° C. |
| F | 400 | 20 | 180° C., 220° C. (by 10) |
| G | 265 | 20 | 80° C., 120° C., 140° C., 160° C., 170° C., 180° C., 200° C. (by 5) |
| H | 150 | 5 | 80° C., 120° C., 140° C., 160° C., 170° C., 180° C., 190° C. (by 3), 200° C. (by 2) |
| I | 265 | 20 | 80° C., 120° C., 140° C., 160° C., 170° C., 180° C., 190° C. (by 3), 200° C. (by 2) |
| J | 250 | 20 | 150° C., 170° C. (by 3), 180° C., 200° C., 220° C. (by 5) |

The temperatures in the table refer to sections of the barrel of the extruder that are capable of independent temperature control. The first ten temperatures are barrel section temperatures and the last temperature indicates the temperature of the die.

TABLE 2

Die configuration

| Condition | Die Description |
|---|---|
| 1 | Large 3 hole strand die - 6 mm holes |
| 2 | Small 3 hole strand die - 4 mm holes |
| 3 | Large 2 hole strand die - 6 mm holes |
| 4 | Single hole Brabender die - 10 mm hole |

TABLE 3

Means of modifier addition

| Condition | Die Description |
|---|---|
| α | Modifier added at block 4 in 2-butanone carrier solvent |
| β | Modifier added at block 4 in xylene carrier solvent |
| γ | Modifier coated onto PP powder - pre tumble blended |
| δ | Modifier coated onto PP powder masterbatch |

The overall extruder configuration and modifier conditions may be recited, for example, as condition: A1δ.

Solvent Addition of Modifiers

The initiator, and monomer if present, was introduced as a solution in 2-butanone or xylene. The concentration of the initiator varied from 5.6% wt/wt. The benzoyl peroxide and the di-toluol peroxides were both powders wetted with 25% (wt/wt) water. The monomer was present in an amount between 4 to 10% wt/wt solvent.

Increased levels of initiator were generally added by increasing th amount of solution added to the polymer melt. The additional peroxides (if any) were added with the initiator in the carrier solvent.

Solventless Addition of Modifiers t-Butyl peroxybenzoate is a liquid. The solventless modification of the polymer was achieved by absorbing the initiator onto powdered polymer or blending it with powdered polymer at concentrations ranging from 5% wt/wt to 10% wt/wt to form a masterbatch. The masterbatch was added to the extruder in varying feed rates to alter the amount of additives. The amount of polymer feed was adjusted accordingly to give constant overall feed rate.

The stabilisers were also added as a masterbatch. The amount of stabiliser was generally kept constant at 0.33% wt/wt Irganox 1010 and 0.17% wt/wt Irgaphos 168 in the total composition.

The main polymer feed was added as either powder or pellets.

Single Screw Extruders

Killion

The Killion single screw extruder used in the examples was a segmented single screw extruder of L/D=40 (11 barrel sections, 10 heated) and screw diameter of 31.75 mm.

Polypropylene powder, stabilisers (0.33% wt/wt Irganox 1010, 0.17% wt/wt Irgaphos 168 in total) and initiator were added to the feed throat of the single screw extruder via a twin screw K-Tron volumetric feeder.

Alternatively, the polypropylene powder and stabilisers were added via the K-Tron feeder and polypropylene powder, stabilisers and the modifiers were added as a master batch via a single screw APV Accurate volumetric feeder. The masterbatch contained 7.5% wt/wt benzoyl peroxide (prepared using a dispersion of benzoyl peroxide containing 25% wt/wt water).

The output of the extruder was ~1.5 kg/hr using a screw speed of 30 rpm. The set barrel temperature was either (I) a flat 220° C. with each barrel section and the die set at a temperature of 220° C. or (ii) 230° C./190° C. with the first six melting sections of the barrel set at 230° C. and the next four metering sections of the barrel and the die set at 190° C. The melt temperature varied from 220 to 260° C.

Brabender

The Brabender single screw extruder used was a single screw extruder of L/D=25 (4 Barrel sections), compression ratio 2.5:1 and screw diameter of 19 mm. The die was a 4 mm rod die.

The screw speed of the extruder was 20 rpm. The set barrel temperature was 140° C., 170° C., 180° C., 180° C. Residences time: Start 3 min 40 sec; Middle 4 min 35 sec; and End 7 min 30 sec.

Polypropylene powder either as cryoground pellets or ex-reactor powder was mixed with the modifiers and added to the feed throat, either flood feed or by a Brabender single screw volumetric feeder.

The following commercial polypropylene (co)polymers were used in the examples. The properties of the (co) polymers are shown in Table 4 below.

TABLE 4

Comparative data for a grade of high melt strength PP and conventional PP grades.

| Example | Polymer | Polymer Description | MFI 2.16 kg @ 230° C. | Melt Strength cN |
|---|---|---|---|---|
| Control 1 | Montell PF814 | High melt strength polypropylene homopolymer | 3 | 18 |
| Control 2 | Montell JE6100 | Extrusion grade polypropylene homopolymer | 3 | 3 |
| Control 3 | ICI Australia GYM 45 | Injection moulding grade of polypropylene homopolymer | 14 | 1.8 |
| Control 4 | ICI Australia GWM 22 | Extrusion grade of polypropylene homopolymer | 4 | 2.8 |
| Control 5 | ICI Australia PXCA 6152 | Thermoforming grade of polypropylene homopolymer | 0.8 | 6 |
| Control 6 | ICI Australia LYM 120 | Injection moulding grade of propylene/ethylene copolymer | 14 | 1.4 |
| Control 7 | Montell 6501 | Ex-reactor grade of injection moulding polypropylene homopolymer | 4.1 | ~3 |
| Control 8 | Montell KM6100 | Extrusion grade of polypropylene homopolymer | ~3.5 | — |
| Control 9 | Montell KMT6100 | Extrusion grade of polypropylene homopolymer | ~3.5 | — |
| Control 10 | Montell KM6100 | Ex-reactor grade of polypropylene powder homo-polymer-unstabilized | ~3.5 | — |

*Melt strength and MFI were measured for a particular batch and we have found actual values vary up to 20% of these values.

EXAMPLES 1 TO 5

GYM45 was modified in accordance with Table 5 below. GYM45 is a low molecular weight/higher MFI injection moulding grade of polypropylene homopolymer.

TABLE 5

| Example | Conditions | BPO (wt %) | Styrene (wt %) | Motor Current (amps) | Die Temp. (° C.) | Drop Time (secs.) | MFI 2.16 kg @ 230° C. | Melt Strength (cN) |
|---|---|---|---|---|---|---|---|---|
| Control 3 | — | — | 0 | — | — | — | 14 | 1.8 |
| CE 1 | B1α | 0 | 0 | 13 | 231 | 8 | 12.2 | 1.5 |
| 1 | B1α | 0.36 | 0 | 13 | 229 | 9.7 | 14.4 | 1.9 |
| 2 | B1α | 0.7 | 0 | 13 | 229 | 13.5 | 14.4 | 2.3 |
| 3 | B1α | 0.95 | 0 | 13 | 230 | 17.1 | 12.5 | 3 |
| 4 | D3α | 1.0 | 0 | 19 | 197 | 23 | 9.7 | 4 |
| 5 | D4α | 0.34 | 0.45 | 21 | 179 | 22.9 | 9.1 | 6.9 |

EXAMPLES 6 TO 18

GWM22 was modified in accordance with Table 6. GWM22 is an intermediate molecular weight/medium MFI extrusion grade of polypropylene homopolymer.

TABLE 6

| Example | Conditions | BPO (wt %) | Styrene (wt %) | Motor Current (amps) | Die Temp. (° C.) | Drop Time (secs.) | MFI 2.16 kg @ 230° C. | Melt Strength (cN) |
|---|---|---|---|---|---|---|---|---|
| Control 4 | | | | | | | 4.5 | 2.8 |
| CE 2 | B1α | 0 | 0 | 16 | 239 | 11.3 | 5 | — |
| 6 | B1α | 0.36 | 0 | 16 | 234 | 15.2 | 6.3 | 3 |
| 7 | B1α | 0.75 | 0 | 17 | 238 | 21.8 | 5.9 | 4.7 |
| 8 | B1α | 1 | 0 | 16 | 239 | 25.4 | 5 | 6.9 |
| 9 | B1α | 1.3 | 0 | 20 | 236 | 25.3 | 5.6 | 7.1 |
| 10 | B1α | 0.12 | 0.16 | 16 | 237 | 8.0 | 4.15 | — |
| 11 | B1α | 0.23 | 0.31 | 17 | 237 | 11.2 | 2.8 | 5 |
| 12 | B1α | 0.46 | 0.61 | 21 | 238 | 14 | 1.11 | — |
| 13 | B1α | 0.69 | 0.92 | 21 | 241 | 14.2 | 0.69 | 18.6 |
| 14 | B1α | 1.22 | 1.63 | 21 | 248 | — | — | 18.6 |
| 15 | E1α | 0.33 | 0.44 | 17 | 281 | 20 | 3.6 | 8.2 |
| 16 | C2α | 0.81 | 4.2 | 18 | 203 | 60 | 0.69 | 18.8 |
| 17 | E1α | 0.31 | 0.40 | 20 | 275 | 23 | 3.1 | 7.0 |
| 18 | E1α | 0.30 | 0.53 | 17 | 277 | 24 | 3.4 | 9.1 |

The increase in complex viscosity of example 14, 16, 17 and 18 is shown in FIG. 1. G' has been plotted against frequency in FIG. 2.

The modified polypropylene's of examples 14, 16, 17 and 18 were tested for additional physical properties and it was found that the modified polypropylene's had:

| | 14 | 16 | 17 | 18 | Control 4 | |
|---|---|---|---|---|---|---|
| i) Elasticity rad/s (Pa) | 1200 | 680 | 40 | 45 | 10 | G' @ 0.01 rad/s (pa) |
| ii) 1/Relaxation Time | ~0.0013 | 0.085 | 15 | 18 | 23 | Crossover Frequency (rad/sec) |
| iii) Polydispersity Index | 222 | 39 | 4.4 | 4.7 | 3.7 | $M_w/M_n$ |
| iv) Dow Rheology Index | 192 | 86 | 2.0 | 5.6 | 0 | LongChain Branching |

EXAMPLES 19 TO 26

PXCA6152 was modified in accordance with Table 7 below. PXCA6152 is a high molecular weight/low MFI thermoforming grade of polypropylene homopolymer.

TABLE 7

| Example | Conditions | BPO (wt %) | Styrene (wt %) | Motor Current (amps) | Die Temp. (° C.) | Drop Time (secs.) | MFI 2.16 kg @ 230° C. | Melt Strength (cN) |
|---|---|---|---|---|---|---|---|---|
| Control 5 | | | | | | | 0.8 | 6 |
| CE 3 | F1α | 0 | 0 | 17 | 251 | 14.6 | 1.1 | — |
| 19 | B1α | 0.34 | 0 | 22 | 244 | 25.9 | 1.3 | 7.4 |
| 20 | B1α | 0.68 | 0 | 23 | 250 | 22.8 | 1.1 | 11.1 |
| 21 | B1α | 0.8 | 0 | 24 | 246 | 30.5 | 0.8 | 14 |
| 22 | B1α | 1.04 | 0 | 24 | 247 | 25.3 | 0.65 | 17.7 |
| 23 | F1α | 0.31 | 0.41 | 21 | 256 | 24.4 | 0.42 | 17.5 |
| 24 | F1α | 0.47 | 0.63 | 21 | 264 | 25 | 0.31 | — |
| 25 | F1α | 0.55 | 0.73 | 23 | 269 | — | 0.40 | — |
| 26 | F1α | 0.71 | 0.95 | 22 | 259 | 25 | 0.35 | 21.3 |

The modified polypropylene of example 22 was tested for additional physical properties and it was found that the modified polypropylene had:

| | | | |
|---|---|---|---|
| i) Elasticity | 200 | G' @ 0.01 rad/s (Pa) | |
| ii) 1/Relaxation Time | 7.1 | Crossover frequency (rad/sec) | |
| iii) Polydispersity Index | 3.9 | $M_w/M_n$ | |
| iv) Dow Rheology Index | 10 | Long Chain Branching | |

The DRI of the base polypropylene material, PXCA 6152 (an unbranched polypropylene) was expected to be 0. The DRI of the modified polypropylene demonstrates a significant degree of long chain branching.

EXAMPLES 27 TO 33

LYM120 was modified in accordance with Table 8 below. LYM120 is a low molecular weight/higher MFI injection moulding grade of PP copolymer.

TABLE 8

| Example | Conditions | BPO (wt %) | Styrene (wt %) | Motor Current (amps) | Die Temp. (° C.) | Drop Time (secs.) | MFI 2.16 kg @ 230° C. | Melt Strength (cN) |
|---|---|---|---|---|---|---|---|---|
| Control 6 | | | | | | | 12.2 | 1.4 |
| 27 | D2α | 0.68 | 0 | 13 | 182 | 19.3 | 13.1 | 2.3 |
| 28 | A4α | 1.08 | 0 | 19.5 | 200 | 31 | 9 | 4.2 |
| 29 | A2α | 0.33 | 0.44 | 18 | 202 | 28 | 5.8 | 7.4 |
| 30 | D2α | 0.32 | 0.42 | 23 | 185 | 46.5 | 3.8 | 9.0 |
| 31 | A4α | 0.42 | 0.55 | 19.5 | 204 | 31.1 | 6.5 | 11.2 |
| 32 | A4α | 0.62 | 0.83 | 20 | 201 | 36.8 | — | 11.9 |
| 33 | A4β | 0.34 | 0.45 | 16 | 199 | 25.1 | — | 4.3 |

EXAMPLES 34 TO 42

Ex-reactor GYM45 powder was modified according to Table 9 below. GYM45 is a low molecular weight/higher MFI injection moulding grade of polypropylene homopolymer. The polypropylene was stabilized with Irganox 1010 (0.33 wt %) and Irgaphos (0.17 wt %). The modifiers and stabilizers were added to the twin-screw extruder at the feed throat.

TABLE 9

| Example | Conditions | BPO (wt %) | Styrene (wt %) | Motor Current (amps) | Die Temp. (° C.) | Drop Time (secs.) | MFI 2.16 kg @ 230° C. | Melt Strength (cN) |
|---|---|---|---|---|---|---|---|---|
| Control 3 | — | — | — | — | — | — | 14 | 1.8 |
| CE 4 | H3δ | 0 | 0 | 7 | 209 | 21.5 | 11.3 | 1.7 |
| 34 | I3δ | 0.38 | 0 | 14 | 209 | 12.1 | 13.6 | 1.9 |
| 36 | I3δ | 0.75 | 0 | 15 | 210 | 15.0 | 11.8 | 2.6 |
| 37 | I3δ | 1.5 | 0 | 15 | 214 | 20.6 | 10.3 | 5.7 |
| 38 | H3δ | 0.75 | 0 | 6 | 209 | 35.5 | 17.6 | 2.1 |
| 39 | H3δ | 1.13 | 0 | 8 | 208 | 39.5 | 13.3 | 2.9 |
| 40 | H3δ | 1.5 | 0 | 8 | 208 | 43.3 | 9.8 | 4.4 |
| 41 | I3δ | 0.15 | 0.2 | 18 | 215 | 16.6 | 9.6 | 2.0 |
| 42 | I3δ | 0.23 | 0.3 | 16 | 214 | 20.5 | 6.5 | 5.5 |

EXAMPLES 43 TO 49

GYM45 was modified in accordance with Table 10 below. GYM45 is a low molecular weight/higher MFI injection moulding grade of polypropylene homopolymer.

TABLE 10

| Example | Conditions | Initiator | Initiator (wt %) | Styrene (wt %) | Motor Current (amps) | Die Temp. (° C.) | Drop Time (secs) | MFI 2.16 kg @ 230° C. |
|---|---|---|---|---|---|---|---|---|
| CE 5 | A3α | — | 0 | 0 | 18 | 192 | 11.8 | 12.8 |
| 43 | A3α | BPO | 0.12 | 0.16 | 16 | 197 | 14 | 14.4 |
| 44 | A3α | BPO | 0.21 | 0.28 | 17 | 200 | 18.8 | 9.8 |
| 45 | A3α | BPO | 0.41 | 0.55 | 20 | 206 | 27.6 | 5.6 |
| 46 | A3α | BPO | 0.62 | 0.83 | 22 | 208 | 32.2 | 3.6 |
| CE-6 | A3α | DHBP | 0.33 | 0.09 | 14.5 | 191 | 4.6 | 55. |
| CE-7 | A3α | DHBP | 0.60 | 0.17 | 16 | 190 | 4 | 117 |
| CE-8 | A3α | DHBP | 0.90 | 0.28 | 14.5 | 190 | 3.9 | 132 |
| CE-9 | A3α | TBEH | 0.33 | 0.34 | 16 | 191 | 9.9 | 18.3 |
| CE-10 | A3α | TBEH | 0.60 | 0.62 | 17 | 192 | 10 | 19.5 |
| CE-11 | A3α | TBEH | 0.90 | 0.93 | 17 | 193 | 10.6 | 17.2 |
| 47 | A3α | TBPB | 0.30 | 0.30 | 15 | 194 | 7.8 | 58.3 |
| 48 | A3α | TBPB | 0.68 | 0.70 | 17 | 198 | 14 | 47.3 |
| 49 | A3α | TBPB | 0.89 | 0.91 | 19 | 199 | 15.6 | 38.5 |
| CE-12 | A3α | DCP | 0.08 | 0.09 | 14.5 | 192 | 4.3 | 48.5 |
| CE-13 | A3α | DCP | 0.17 | 0.17 | 15 | 191 | 3.9 | 64.7 |
| CE-14 | A3α | DCP | 0.25 | 0.25 | 15 | 191 | 3.7 | 90.3 |
| CE-15 | A3α | DLP | 0.33 | 0.33 | 15 | 190 | 11.2 | 16.5 |
| CE-16 | A3α | DLP | 0.63 | 0.64 | 15 | 190 | 11.1 | 15.1 |
| CE-17 | A3α | DLP | 0.92 | 0.93 | 15 | 190 | 11.1 | 18.0 |

EXAMPLES 50 TO 54

LYM120 was modified in accordance with Table 11 below. LYM120 is a low molecular weight/higher MFI injection moulding grade of polypropylene copolymer.

TABLE 11

| Example | Conditions | BPO (wt %) | Motor Current (amps) | Die Temp (° C.) | Drop Time (secs.) | MFI 2.16 kg @ 230° C. | Melt Strength (cN) |
|---|---|---|---|---|---|---|---|
| Control 6 | | | | | | 12.2 | 1.4 |
| CE 18 | H3δ | 0 | 7 | 209 | 18.4 | 11.3 | 1.2 |
| 52 | H3δ | 0.75 | 8 | 210 | 50.5 | 6.9 | 2.6 |
| 53 | H3δ | 1.13 | 8 | 210 | 47.0 | 6.6 | 3.3 |
| 54 | I3δ | 1.5 | 14 | 217 | 18.5 | 3.8 | 6.1 |

EXAMPLES 55 TO 61

LYM120 was modified in accordance with Table 12 below. LYM120 is a low molecular weight/higher MFI injection moulding grade of polypropylene copolymer.

TABLE 12

| Example | Conditions | Initiator | Initiator (wt %) | Styrene (wt %) | Motor Current (amps) | Die Temp. (° C.) | Drop Time (secs) | MFI 2.16 kg @ 230° C. | Melt Strength (cN) |
|---|---|---|---|---|---|---|---|---|---|
| CE-19 | A3α | BPO | 0.00 | 0.00 | 16 | 195 | 9.9 | 12.8 | 1.1 |
| 55 | A3α | BPO | 0.12 | 0.16 | 15 | 197 | 13.9 | 10.9 | |
| 56 | A3α | BPO | 0.21 | 0.28 | 17.5 | 201 | 17.7 | 7.50 | |
| 57 | A3α | BPO | 0.41 | 0.55 | 20 | 208 | 25.8 | 4.4 | 11.5 |
| 58 | A3α | BPO | 0.62 | 0.83 | 21 | 209 | 26.5 | 2.9 | |
| CE-20 | A3α | DHBP | 0.08 | 0.09 | 13.5 | 191 | 4.9 | 52 | |
| CE-21 | A3α | DHBP | 0.16 | 0.17 | 14 | 190 | 5.3 | 79 | |
| CE-22 | A3α | DHBP | 0.28 | 0.30 | 14.5 | 190 | 5.6 | 114 | |
| CE-23 | A3α | TBEH | 0.31 | 0.32 | 14 | 192 | 8.6 | 17.8 | |
| CE-24 | A3α | TBEH | 0.62 | 0.64 | 14 | 192 | 9 | 17.4 | |
| CE-25 | A3α | TBEH | 0.98 | 1.01 | 14 | 192 | 9.6 | 15.4 | |
| 59 | A3α | TBPB | 0.30 | 0.31 | 14 | 196 | 4.6 | 33.8 | |
| 60 | A3α | TBPB | 0.61 | 0.62 | 17 | 200 | 14.6 | 32.9 | |
| 61 | A3α | TBPB | 0.93 | 0.95 | 17 | 202 | 15.6 | 23.1 | |
| CE-26 | A3α | DCP | 0.08 | 0.09 | 13 | 192 | 5 | 38.6 | |
| CE-27 | A3α | DCP | 0.17 | 0.17 | 13.5 | 190 | 5.5 | 57.6 | |
| CE-28 | A3α | DCP | 0.27 | 0.28 | 14 | 190 | 6.2 | 65.9 | |
| CE-29 | A3α | DLP | 0.31 | 0.31 | 15 | 191 | 9.9 | 15.7 | |
| CE-30 | A3α | DLP | 0.64 | 0.65 | 13.5 | 190 | 9.8 | 14.8 | |
| CE-31 | A3α | DLP | 1.00 | 1.01 | 13 | 190 | | 14.8 | |

EXAMPLES 62 TO 73

LYM120 was modified in accordance with Table 13 below. LYM120 is a low molecular weight/higher MFI injection moulding grade of polypropylene copolymer.

TABLE 13

| Example | Conditions | Initiator | Initiator (wt %) | Styrene (wt %) | Motor Current (amps) | Die Temp. (° C.) | Drop Time (secs) | MFI 2.16 kg @ 230° C. | Melt Strength (cN) |
|---|---|---|---|---|---|---|---|---|---|
| CE-32 | A3δ | — | 0 | | 14.5 | 200 | 10 | 12.4 | 1.1 |
| 62 | A3δ | BPO | 0.11 | 0 | 14 | 199 | 10 | 11.5 | 1.1 |
| 63 | A3δ | BPO | 0.23 | 0 | 16.5 | 201 | 15.1 | 9.0 | 1.2 |
| 64 | A3δ | BPO | 0.45 | 0 | 16.5 | 203 | 20.6 | 6.6 | 1.7 |
| 65 | A3δ | BPO | 0.68 | 0 | 17.5 | 206 | 20.6 | 5.4 | 4.1 |
| 66 | A3δ | BPO | 1.13 | 0 | 18 | 206 | 18.6 | 5.7 | 3.9 |
| CE-33 | A3δ | DLP | 0.31 | 0 | 13.5 | 198 | 9.3 | 13.6 | — |
| CE-34 | A3δ | DLP | 0.59 | 0 | 14 | 199 | 8.8 | 14.4 | — |
| CE-35 | A3δ | DLP | 0.89 | 0 | 13 | 196 | 8.9 | 15.0 | — |
| CE-36 | A3δ | TBPB | 0.07 | 0 | 12 | 189 | 5.1 | 28.7 | — |
| CE-37 | A3δ | TBPB | 0.15 | 0 | 12 | 190 | 5.3 | 31.0 | — |
| CE-38 | A3δ | TBPB | 0.29 | 0 | 10.5 | 185 | 6.3 | 92.0 | 0.5 |
| CE-39 | A3δ | TBPB | 0.59 | 0 | 11 | 186 | 11.2 | 102.0 | — |
| 67 | A3δ | BPO | 0.11 | 0.15 | 17.5 | 205 | 19.1 | 5.7 | 2.4 |
| 68 | A3δ | BPO | 0.23 | 0.30 | 19.5 | 210 | 25 | 4.3 | 6.3 |
| 69 | A3δ | BPO | 0.45 | 0.6 | 21.5 | 209 | 27.8 | 2.1 | 10.4 |
| 70 | A3δ | BPO | 0.90 | 1.2 | 23.5 | 210 | 26.8 | 1.3 | 12.2 |
| CE-40 | A3δ | DLP | 0.30 | 0.3 | 14.5 | 199 | 9.4 | 14.1 | — |
| CE-41 | A3δ | DLP | 0.59 | 0.6 | 13 | 197 | 9.3 | 17.2 | — |
| CE-42 | A3δ | DLP | 0.89 | 0.9 | 13 | 197 | 9.8 | 16.1 | — |
| 71 | A3δ | TBPB | 0.29 | 0.3 | 13.5 | 196 | 11.4 | 20.4 | 3.7 |
| 72 | A3δ | TBPB | 0.59 | 0.6 | 16.5 | 200 | 20.2 | 12.9 | — |
| 73 | A3δ | TBPB | 1.18 | 1.2 | 17 | 202 | 18.8 | 13.9 | 4.5 |

EXAMPLES 74 TO 77

GYM45 was modified in accordance with Table 13 below. GYM45 is a low molecular weight/higher MFI injection moulding grade of polypropylene homopolymer.

TABLE 13

| Example | Conditions | Initiator | Initiator (wt %) | Motor Current (amps) | Die Temp. (° C.) | Drop Time (secs) | MFI 2.16 kg @ 230° C. |
|---|---|---|---|---|---|---|---|
| CE 43 | A3α | — | 0 | 18 | 192 | 11.8 | 12.8 |
| 74 | A3α | BPO | 0.23 | 16.5 | 196 | 10.35 | 17.0 |
| 75 | A3α | BPO | 0.45 | 17 | 199 | 11.8 | 17.3 |
| 76 | A3α | BPO | 0.73 | 17 | 200 | 15.9 | 15.4 |
| 77 | A3α | BPO | 0.96 | 18 | 202 | 17.3 | 14.9 |
| CE-44 | A3α | DHBP | 0.08 | 15 | 191 | 3.6 | 96 |
| CE-45 | A3α | DHBP | 0.17 | 14.5 | 190 | 3.1 | 169 |
| CE-46 | A3α | DHBP | 0.29 | 13 | 188 | 2.3 | >100 |
| CE-47 | A3α | DHBP | 0.30 | 13 | 188 | 2.2 | >200 |
| CE-48 | A3α | DHBP | 0.50 | 13.5 | 186 | 1.9 | >200 |
| CE-49 | A3α | DHBP | 0.57 | 12 | 186 | 1.9 | >100 |
| CE-50 | A3α | TBEH | 0.30 | 17 | 197 | 8.8 | 12.0 |
| CE-51 | A3α | TBEH | 0.64 | 14 | 188 | 7.2 | 24.4 |
| CE-52 | A3α | TBEH | 0.98 | 14 | 189 | 6.8 | 25.6 |
| CE-53 | A3α | TBPB | 0.31 | 13 | 186 | 2.6 | 95 |
| CE-54 | A3α | TBPB | 0.64 | 13 | 184 | 2.1 | 238 |
| CE-55 | A3α | TBPB | 1.03 | 12 | 184 | 1.9 | >250 |
| CE-56 | A3α | DCP | 0.08 | 16 | 192 | 3.8 | 47.1 |
| CE-57 | A3α | DCP | 0.17 | 14 | 189 | 2.9 | 121.3 |
| CE-58 | A3α | DLP | 0.32 | 16 | 191 | 10.9 | 14.5 |
| CE-59 | A3α | DLP | 0.64 | 16 | 190 | 10.6 | 17.9 |
| CE-60 | A3α | DLP | 0.95 | 16 | 189 | 10.4 | 16.6 |

EXAMPLES 78 TO 82

LYM120 was modified in accordance with Table 14 below. LYM120 is a low molecular weigh/higher MFI injection moulding grade of polypropylene copolymer.

TABLE 14

| Example | Conditions | Initiator | Initiator (wt %) | Motor Current (amps) | Die Temp. (° C.) | Drop Time (secs) | MFI 2.16 kg @ 230° C. |
|---|---|---|---|---|---|---|---|
| Control 24 | A3α | BPO | 0 | 16 | 195 | 9.9 | 12.8 |
| 78 | A3α | BPO | 0.25 | 15 | 196 | 10.3 | 13.4 |
| 79 | A3α | BPO | 0.47 | 14 | 198 | 13.2 | 13.1 |
| 80 | A3α | BPO | 0.64 | 16 | 198 | 13.9 | 12.9 |
| 81 | A3α | BPO | 0.70 | 17 | 201 | 13.6 | 11.9 |
| 82 | A3α | BPO | 0.94 | 18 | 198 | 13.5 | 10.6 |
| CE-61 | A3α | DHBP | 0.09 | 14 | 190 | 3.6 | 80 |
| CE-62 | A3α | DHBP | 0.16 | 13 | 188 | 3.1 | 160 |
| CE-63 | A3α | DHBP | 0.26 | 13 | 187 | 2.8 | 250 |
| CE-64 | A3α | TBEH | 0.29 | 15 | 193 | 7 | |
| CE-65 | A3α | TBEH | 0.60 | 13 | 192 | 6.7 | 19.4 |
| CE-66 | A3α | TBEH | 1.02 | 12 | 191 | 6 | 22.6 |
| CE-67 | A3α | TBPB | 0.30 | 13 | 186 | 3.6 | 85 |
| CE-68 | A3α | TBPB | 0.61 | 12 | 184 | 3.8 | 173 |
| CE-69 | A3α | TBPB | 0.92 | 12 | 184 | 3.4 | >250 |
| CE-70 | A3α | DCP | 0.08 | 16 | 192 | 4.5 | 14.6 |
| CE-71 | A3α | DCP | 0.17 | 13 | 190 | 3 | 107 |
| CE-72 | A3α | DCP | 0.25 | 13 | 188 | 3 | 131 |
| CE-73 | A3α | DLP | 0.32 | 14.5 | 191 | 9.5 | 14.3 |
| CE-74 | A3α | DLP | 0.68 | 15 | 191 | 9.4 | 15.8 |
| CE-75 | A3α | DLP | 0.98 | 14.5 | 193 | 8.7 | 21.0 |

EXAMPLES 83 TO 92

LYM120 was modified in accordance with Table 15 below. LYM120 is a low molecular weight/higher MFI injection moulding grade of polypropylene copolymer.

TABLE 15

| Example | Conditions | Initiator | Initiator (wt %) | Styrene (wt %) | Mole Ratio Sty/Init | Motor Current (amps) | Die Temp. (° C.) | Drop Time (secs) | MFI 2.16 kg @ 230° C. | Melt Strength (cN) |
|---|---|---|---|---|---|---|---|---|---|---|
| CE-76 | A3α | 0 | 0 | 0 | — | 16 | 195 | 9.9 | 12.8 | 1.1 |
| 83 | A3α | BPO | 0.43 | 0.19 | 1.04 | 16 | 207 | 18.5 | 6.9 | — |
| 84 | A3α | BPO | 0.41 | 0.37 | 2.07 | 19 | 207 | 22.5 | 4.9 | — |
| 85 | A3α | BPO | 0.41 | 0.55 | 3.11 | 20 | 208 | 25.8 | 4.4 | 11.6 |
| 86 | A3α | BPO | 0.43 | 0.76 | 4.14 | 21 | 210 | 25.4 | 3.9 | — |
| 87 | A3α | BPO | 0.45 | 0.99 | 5.18 | 20 | 205 | 28.3 | 4.4 | — |
| 88 | A3α | TBPB | 0.56 | 0.19 | 0.78 | 13 | 192 | 8.9 | 71 | — |
| 89 | A3α | TBPB | 0.55 | 0.37 | 1.57 | 14 | 196 | 11.0 | 38 | — |
| 90 | A3α | TBPB | 0.61 | 0.62 | 1.91 | 17 | 200 | 14.6 | 33 | — |
| 91 | A3α | TBPB | 0.54 | 0.73 | 3.14 | 16 | 201 | 16.0 | 19.2 | — |
| 92 | A3α | TBPB | 0.58 | 0.97 | 3.92 | 19 | 204 | 16.2 | 15.7 | — |
| CE-77 | A3α | DHBP | 0.27 | 0.1 | 0.84 | 13 | 190 | 4.4 | 187 | — |
| CE-78 | A3α | DHBP | 0.25 | 0.18 | 1.69 | 14 | 191 | 5.3 | 125 | — |
| CE-79 | A3α | DHBP | 0.28 | 0.30 | 3.04 | 14.5 | 190 | 5.6 | 114 | — |
| CE-80 | A3α | DHBP | 0.27 | 0.40 | 3.38 | 15 | 193 | 6.2 | 116 | — |
| CE-81 | A3α | DHBP | 0.28 | 0.50 | 4.22 | 14 | 192 | 6.1 | 118 | — |

EXAMPLES 93 TO 97

GYM45 was modified in accordance with Table 16 below. GYM45 is a low molecular weight/higher MFI injection moulding grade of polypropylene homopolymer.

TABLE 16

| Example | Conditions | Initiator | Initiator (wt %) | Styrene (wt %) | Mole Ratio Sty/Init | Motor Current (amps) | Die Temp (° C.) | Drop Time (secs) | MFI 2.16 kg @ 230° C. |
|---|---|---|---|---|---|---|---|---|---|
| CE-82 | A3α | — | 0.00 | 0.00 | 0.00 | 18 | 192 | 11.8 | 12.75 |
| 93 | A3α | BPO | 0.36 | 0.16 | 1.04 | 18 | 202 | 18.1 | 11.17 |
| 94 | A3α | BPO | 0.41 | 0.37 | 2.07 | 18 | 209 | 23.5 | 6.38 |
| 95 | A3α | BPO | 0.41 | 0.55 | 3.11 | 20 | 206 | 27.6 | 5.62 |
| 96 | A3α | BPO | 0.43 | 0.76 | 4.14 | 22 | 209 | 25.7 | 4.05 |
| 97 | A3α | BPO | 0.40 | 0.89 | 5.18 | 21 | 207 | 31.2 | 4.27 |

EXAMPLE 98 TO 105

LYM120 was modified in accordance with Table 17 below. LYM120 is a low molecular weight/higher MFI injection moulding grade of polypropylene copolymer.

TABLE 17

| Example | Conditions | Initiator #1 wt % | Initiator #2 wt % | Mole ratio Init #1/Init #2 | Monomer wt % | Mole ratio Monomer/ tot init | Motor Current (amps) | Drop time secs | Die Temp ° C. | MFI | Melt strength (cN) |
|---|---|---|---|---|---|---|---|---|---|---|---|
| | | | Initiator #1 = BPO, Initiator #2 = DHBP, Monomer = Styrene | | | | | | | | |
| 98 | A3δ | 0.43 | 0.06 | 9.08 | 0.57 | 2.81 | 19 | 17 | 204 | 6.9 | 3.8 |
| 99 | A3δ | 0.43 | 0.11 | 4.54 | 0.58 | 2.57 | 19 | 14.8 | 203 | 10.5 | 2.9 |
| 100 | A3δ | 0.43 | 0.17 | 3.03 | 0.58 | 2.37 | 18 | 14 | 201 | 16.9 | — |
| | | | Initiator #1 = BPO, Initiator #2 = TBPB, Monomer = Styrene | | | | | | | | |
| 101 | A3δ | 0.43 | 0.11 | 3.07 | 0.58 | 2.36 | 20 | 18.7 | 208 | 5 | 5.5 |
| 102 | A3δ | 0.43 | 0.22 | 1.53 | 0.58 | 1.92 | 17 | 14.2 | 204 | 9.3 | 4.2 |
| 103 | A3δ | 0.43 | 0.34 | 1.02 | 0.59 | 1.62 | 18 | 14 | 204 | 11.6 | — |
| 104 | A3δ | 0.43 | 0.45 | 0.77 | 0.60 | 1.40 | 18 | 11.8 | 201 | 19.5 | — |
| 105 | A3δ | 0.43 | 0.34 | 1.02 | 0.94 | 2.59 | 21 | 17 | 207 | 7.5 | 6.3 |

EXAMPLE 108 TO 109

Montell 6501 was modified in accordance with Table 19 below on the Killion screw extruder described above.

| Sample | Barrel Temp (° C.) | Extruder Output (kg/hr) | BPO wt % | Styrene wt % | Motor Current (amps) | Die Temp (° C.) | Drop Time (secs) | MFI (g/10 min) |
|---|---|---|---|---|---|---|---|---|
| Control 7 | — | — | — | — | — | — | — | 4.1 |
| CE 84 | 220 flat | 1.4 | 0 | 0 | 6 | 256 | 17 | 4.1 |
| 108 | 220 flat | 1.4 | 2.1 | 0.25 | 6 | 260 | 35 | 2.2 |
| 109 | 220 flat | 1.4 | 4.2 | 0.5 | 7.5 | 263 | 33 | 0.40 |

EXAMPLES 40, 41, 7, 12, 28, 29, 31 AND 14

GPC molecular weights were determined using a Waters 150C high temperature GPC unit. 1,2,4-trichlorobenzene was used as the solvent, eluting through two Ultrastyragel linear columns. The oven temperature was set at 140° C. and the pump flow rate was 1.0 ml/min.

Calibration was performed using narrow polydispersity polystyrene standards. All molecular weights quoted as linear polystyrene equivalents.

Mn=number average molecular weight

Mw=weight average molecular weight

Mz=viscosity average molecular weight

Mp=peak molecular weight

Error are quoted as two times the standard deviation between duplicate injections.

TABLE 20

| Example No. | Cond. | BPO (wt %) | Sty (wt %) | MFI (g/10 min) | Melt str (cN) | Mn (g/mol) × $10^{-3}$ | Mw (g/mol) × $10^{-3}$ | Mz (g/mol) × $10^{-3}$ | Mp (g/mol) × $10^{-3}$ |
|---|---|---|---|---|---|---|---|---|---|
| Intermediate Molecular Weight PP Homopolymer (GWM 22) | | | | | | | | | |
| Control 4 | — | — | — | 4.5 | 2.8 | 55 | 295 | 1200 | 105 |
| 8 | B1α | 1.0 | | 5.0 | 6.9 | 80 | 425 | 1415 | 200 |
| 10 | B1α | 0.12 | 0.16 | 4.15 | — | 90 | 405 | 1200 | 235 |
| 11 | B1α | 0.23 | 0.31 | 2.80 | 5.0 | 75 | 415 | 1400 | 195 |
| 12 | B1α | 0.46 | 0.61 | 1.11 | — | 70 | 555 | 2200 | 205 |
| 13 | B1α | 0.69 | 0.92 | 0.69 | 18.6 | 85 | 575 | 2200 | 180 |
| 110 | C2α | 1.50 | | 3.8 | — | 75 | 430 | 1560 | 160 |
| 111 | C2α | 2.23 | | 3.2 | — | 75 | 430 | 1700 | 150 |
| 112 | C1α | 0.37 | 0.49 | 2.22 | — | 85 | 565 | 2035 | 215 |
| 113 | C1α | 0.60 | 0.80 | 1.00 | 19.4 | 85 | 690 | 2575 | 170 |
| 114 | C1α | 0.32 | 1.65 | 4.50 | — | 80 | 505 | 1835 | 170 |
| 115 | C1α | 0.47 | 2.45 | 1.58 | — | 90 | 605 | 2160 | 205 |
| 116 | C1α | 0.81 | 4.19 | 0.69 | 18.8 | 85 | 675 | 2610 | 185 |
| Low Molecular Weight PP Copolymer (PXCA 6152) | | | | | | | | | |
| Control 5 | — | — | — | 12.4 | 1.4 | 45 | 230 | 720 | 130 |
| 22 | B1α | 1.04 | | 0.65 | 17.7 | 110 | 485 | 1615 | 195 |
| 27 | A2α | 0.33 | 0.44 | — | 7.4 | 65 | 325 | 1045 | 140 |
| 61 | A2α | 0.41 | 0.55 | 4.4 | 11.5 | 60 | 325 | 1315 | 125 |
| 62 | A2α | 0.62 | 0.83 | 2.9 | — | 70 | 460 | 2435 | 135 |
| — | D2α | 0.28 | 0.38 | — | — | 80 | 555 | 2875 | 160 |
| 28 | D2α | 0.32 | 0.44 | — | 9.0 | 120 | 640 | 4130 | 140 |
| 78 | A3α | 0.25 | | 13.4 | — | 70 | 315 | 1330 | 135 |
| 79 | A3α | 0.47 | | 13.1 | — | 65 | 320 | 1380 | 130 |
| 80 | A3α | 0.64 | | 12.9 | — | 65 | 360 | 1975 | 130 |
| 27 | D3α | 0.68 | | 13.1 | 2.3 | 70 | 445 | 1865 | 140 |

*Errors in the molecular weight are generally less than 30% of the quoted value, as is usual in high temperature GPC under the conditions employed.

EXAMPLES 110 TO 114

GWM22 and KM6100 were modified in accordance with Table 20 below.

Table 20: Effect of feed throat addition of BPO on the modification of prestabilised PP homopolymer.

TABLE 20

Effect of feed throat addition of BPO on the modification of prestabilised PP homopolymer

| Example | Conditions | Powder wt % α | BPO (wt %) | Motor Current (amps) | Drop Time (sec) | Die Temp ° C. | MFI (g/10 min.) | Melt Str. (cN) |
|---|---|---|---|---|---|---|---|---|
| Prestabilised PP homopolymer GWM 22 | | | | | | | | |
| Control 4 | | | | | | | ~4 | 2.8 |
| 110 | J3δ | 8.8 | 0.92 | 25 | 18 | 244 | 3.9 | 11.0 |
| 111 | J3δ | 13.3 | 1.40 | 30 | 19 | 248 | 2.6 | 8.5 |
| Prestabilised PP Homopolymer KM6100 | | | | | | | | |
| Control 8 | | | | | | | ~3.5 | 2.5 |
| CE-85 | J3δ | 0 | 0 | 27 | 11 | 240 | 3.7 | 2.5 |
| 112 | J3δ | 2.0 | 0.41 | 26 | 15 | 235 | 4.9 | 3.9 |
| 113 | J3δ | 3.9 | 0.81 | 27 | 19 | 241 | 3.3 | 6.7 |
| 114 | J3δ | 6.2 | 1.28 | 28 | 19 | 241 | 2.7 | 9.5 |

α: BPO added to pellet feed in PP powder derived from cryoground prestabilised PP pellets

EXAMPLES 115 TO 117

KMT6100 was modified in accordance with Table 22 below. KMT6100 is a prestabilised PP copolymer.

Table 22: Effect of feed throat addition of BPO on the modification of prestabilised PP homopolymer.

TABLE 22

Effect of feed throat addition of BPO on the modification of prestabilised PP homopolymer

| Example | Conditions | Powder wt % α | BPO (wt %) | Motor Current (amps) | Drop Time (sec) | Die Temp ° C. | MFI (g/10 min.) | Melt Str. (cN) |
|---|---|---|---|---|---|---|---|---|
| Control 9 | | | | | | | ~3.5 | 2.0 |
| CE-86 | J3δ | 0 | 0 | 24 | 8 | 231 | 4.4 | 2.0 |
| 115 | J3δ | 1.9 | 0.40 | 25 | 10 | 233 | 5.4 | 1.9 |
| 116 | J3δ | 3.0 | 0.81 | 24 | 13 | 235 | 4.4 | 3.1 |
| 117 | J3δ | 5.9 | 1.22 | 29 | 15 | 237 | 3.0 | 4.5 |

α: BPO added to pellet feed in PP powder derived from cryoground prestabilised PP pellets

EXAMPLES 118 TO 121

KM6100u was modified with para-toluoyl peroxide (PTP) and BPO in accordance with Table 23 below. The KM6100u was stabilized with Irganox 1010 (0.33 wt %) and Irgaphos 168 (0.17 wt %) which were added to the main feed throat of the extruder.

TABLE 23

| Example | Conditions | Peroxide | Peroxide (wt %) | Motor Current (amps) | Drop Time (sec) | Die Temp ° C. | MFI (g/10 min.) | Melt Str. (cN) |
|---|---|---|---|---|---|---|---|---|
| Control 10 | | | | | | | ~3.5 | ~2.5 |
| CE-87 | J3δ | — | 0 | 22 | 9 | 240 | 5.2 | 2.7 |
| 118 | J3δ | BPO | 1.0 | 22 | 17 | 252 | 5.2 | 7.2 |
| 119 | J3δ | PTP | 1.0 | 21 | 16 | 240 | 5.2 | 6.8 |
| 120 | J3δ | PTP | 1.5 | 22 | 18 | 239 | 3.9 | 14.2 |
| 121 | J3δ | PTP | 2.0 | | 24 | 243 | 3.4 | 14.0 |

EXAMPLES 122 TO 128

PXCA6152 was modified with mixed initiator systems in accordance with Table 24 below.

TABLE 24

| Example | Conditions | Init #1 wt % | Init #2 wt % | Mole ratio Init #1/Init #2 | Motor Current (amps) | Drop Time (sec) | Die Temp ° C. | MFI (g/10 min.) | Melt Str. (cN) |
|---|---|---|---|---|---|---|---|---|---|
| Control 5 | | | | | | | | 0.8 | 6 |
| CE-88 | B3α | 0 | 0 | — | 22 | 14 | 255 | 0.9 | 5.1 |
| 122 | B3α | 0.87 | 0 | — | 24 | 20 | 257 | 1.28 | 14.2 |
| Initiator #1 = BPO, Initiator #2 = DHBP | | | | | | | | | |
| 123 | B3α | 0.87 | 0.045 | 23.2 | 22 | 19 | 251 | 4.0 | 8.0 |
| 124 | B3α | 0.87 | 0.064 | 16.3 | 20 | 16 | 250 | 5.4 | — |
| 125 | B3α | 0.87 | 0.084 | 12.4 | 20 | 15 | 248 | 6.4 | 0.2 |
| Initiator #1 = BPO, Initiator #2 = TBPB | | | | | | | | | |
| 126 | B3α | 0.87 | 0.006 | 129.4 | 22 | 16 | 254 | 3.4 | — |
| 127 | B3α | 0.87 | 0.012 | 64.7 | 20 | 16 | 249 | 3.9 | 0.5 |
| 128 | B3α | 0.87 | 0.019 | 40.9 | 20 | 16 | 249 | 6.4 | 0.1 |

EXAMPLES 129 TO 132

Cryoground PXCA6152 in the form in the form of a powder was modified with initiator system according to Table 25 below.

TABLE 25

Effect of Mixed Initiators on the Modification of PXCA6152 Powder α (cryoground pellets)

| Example | Conditions | Init #1 wt % | Init #2 wt % | Mole ratio Init #1/Init #2 | Motor Current (amps) | Drop Time (sec) | Die Temp ° C. | MFI (g/10 min.) | Melt Str. (cN) |
|---|---|---|---|---|---|---|---|---|---|
| Control 5 | | | | | | | | 0.8 | 6 |
| CE-89 | B3δ | 0 | 0 | — | 25 | 13 | 256 | 1.0 | — |
| Initiator #1 = BPO, Initiator #2 = DHBP | | | | | | | | | |
| 129 | B3δ | 0.86 | 0 | — | 23 | 17 | 253 | 1.8 | 10.8 |
| 130 | B3δ | 0.87 | 0.004 | | 23 | 17 | 254 | 2.1 | 8.8 |
| Initiator #1 = BPO, Initiator #2 = TBPB | | | | | | | | | |
| 131 | B3δ | 0.87 | 0.016 | | 24 | 18 | 253 | 2.6 | 8.2 |
| 132 | B3δ | 0.87 | 0.026 | | 23 | 17 | 253 | 3.6 | 7.7 |

EXAMPLES 79 TO 85

LYM120 was modified in accordance with Table 26 below.

TABLE 26

| Example | Conditions | BPO wt % | Monomer/ Coagent | Monomer wt % | Motor Current (amps) | Drop Time (sec) | Die Temp ° C. | MFI (g/10 min.) | Melt Str. (cN) |
|---|---|---|---|---|---|---|---|---|---|
| Control 6 | | | | | | | | 12.2 | 1.4 |
| CE-76 | Aα | 0 | none | 0 | 16 | 10 | 195 | 12.8 | 1.1 |
| 79 | Aα | 0.47 | none | 0 | 14 | 13 | 198 | 13.2 | — |
| 85 | Aα | 0.41 | Styrene | 0.54 | 20 | 25.8 | 208 | 4.4 | 11.6 |

EXAMPLE 133

GYM 22 was modified in accordance with Table 27 below.

TABLE 27

| Example | Conditions α | BPO wt % | Monomer/ Coagent | Monomer wt % | Motor Current (amps) | Drop Time (sec) | Die Temp ° C. | MFI (g/10 min.) | Melt Str. (cN) |
|---|---|---|---|---|---|---|---|---|---|
| Control 4 | | | | | | | | 4.5 | 2.8 |
| CE-2 | B1α | 0 | none | — | 16 | 11 | 239 | 5 | — |
| 6 | B1α | 0.36 | none | — | 16 | 15 | 234 | 6.3 | 3 |
| 133 | B1α | 0.34 | Styrene | 0.45 | 21 | 29 | 250 | 1.72 | — |

EXAMPLES 134 TO 137

Cryoground KM6100 in the form of a powder was modified on a Brabender single screw extruder in accordance with the general description of the Brabender SSE above and Table 28 below. The initiator was added at the feed throat of the SSE along with the stabilizers (0.33 wt % Irganox 1010 and 0.17 wt % Irgaphos 168).

TABLE 28

| Example | Peroxide Type | Peroxide (wt %) | MFI (g/10 min.) |
|---|---|---|---|
| Control 8 | — | 0 | 3.5 |
| 134 | BPO | 1 | 2.9 |
| 135 | PTP | 0.5 | 3.8 |
| 136 | PTP | 1 | 3.3 |
| 137 | PTP | 2 | 2.0 |

*PTP - Paratoluol Peroxide (bis paramethyl benzoyl peroxide)

EXAMPLE 138

PXCA6152 was modified in accordance with Table 29 below.

TABLE 29

| | | | | | | | | |
|---|---|---|---|---|---|---|---|---|
| | | | Modification of PXCA6152 Pellets | | | | | |
| Example | Conditions | BPO wt % | Styrene wt % | Motor Current (amps) | Drop Time (sec) | Die Temp ° C. | MFI (g/10 min.) | Melt Str. (cN) |
| Control 5 | | | | | | | 0.8 | 6.0 |
| CE-94 | B3α | 0 | — | 22 | 14 | 255 | 0.9 | 5.1 |
| 138 | B3α | 0.51 | 0.68 | 24 | 19 | 279 | 0.6 | 21.0 |

EXAMPLES 139 TO 143

The modified PXCA6152 produced according to Example 138 was melt with GYM45 in accordance with Table 30.

TABLE 30

| | | | | | | | | |
|---|---|---|---|---|---|---|---|---|
| | | Blends of the Modified PP with other PP Homopolymers | | | | | | |
| Example | Conditions | PP#1 (wt %) | PP#1 (wt %) | Motor Current (amps) | Drop time (seconds) | Die Temp ° C. | MFI | Melt Strength |
| CE-95 | A3 | Control 5 (5) | Control 3 (95) | 18 | 11 | 206 | 9.9 | |
| CE-96 | A3 | Control 5 (10) | Control 3 (90) | 19 | 12 | 202 | 7.8 | |
| CE-97 | A3 | Control 5 (15) | Control 3 (95) | 19 | 13 | 202 | 7.0 | |
| CE-98 | A3 | Control 5 (20) | Control 3 (80) | 19 | 14 | 202 | 5.5 | |

TABLE 30-continued

Blends of the Modified PP with other PP Homopolymers

| Example | Conditions | PP#1 (wt %) | PP#1 (wt %) | Motor Current (amps) | Drop time (seconds) | Die Temp ° C. | MFI | Melt Strength |
|---|---|---|---|---|---|---|---|---|
| CE-99 | A3 | Control 5 (25) | Control 3 (75) | 19 | 15 | 202 | 4.7 | 2.6 |
| 139 | A3 | 138 (5) | Control 3 (95) | 19 | 15 | 199 | 9.3 | |
| 140 | A3 | 138 (10) | Control 3 (90) | 19 | 16 | 201 | 7.4 | |
| 141 | A3 | 138 (15) | Control 3 (85) | 19 | 18 | 203 | 6.6 | |
| 142 | A3 | 138 (20) | Control 3 (80) | 20 | 19 | 204 | 5.0 | |
| 143 | A3 | 138 (25) | Control 3 (75) | 19 | 20 | 207 | 4.7 | 5.2 |
| CE-100 | A3 | — | Control 4 (100) | 20 | 15 | 208 | 5.3 | |
| 144 | A3 | 138 (5) | Control 4 (95) | 21 | 18 | 207 | 3.7 | |
| 145 | A3 | 138 (10) | Control 4 (90) | 21 | 19 | 206 | 3.5 | |
| 146 | A3 | 138 (15) | Control 4 (85) | 22 | 21 | 210 | 2.3 | |
| 147 | A3 | 138 (20) | Control 4 (80) | 22 | 21 | 212 | 2.6 | |
| 148 | A3 | 138 (25) | Control 4 (75) | 23 | 23 | 213 | 2.4 | 7.7 |

EXAMPLES OF CARBON DIOXIDE FOAMING OF MODIFIED PP

The equipment used for foaming the polypropylene (from earlier examples) was a tandem extrusion line made up of an Leitritz twin screw extruder (34 mm screw diameter, co-rotating, with 11 barrel sections) connected via a melt pipe to a single screw extruder (43 mm screw diameter). $CO_2$ was introduced into barrel six of the twin screw extruder. The gassed polymer was then cooled slowly in the single screw extruder.

| Example | MFI (g/10 min) | Melt Strength (cN) | Foaming Temp (20 C.) | Av Foam Density (g/cc) | Av Cell Size (μm) |
|---|---|---|---|---|---|
| Control 1 | 3 | 18 | 166 to 159 | 0.058 | 550 |
| 25 | 0.4 | — | 169 to 159 | 0.044 | 300 |
| 31 | 6.5 | 11.2 | 167 to 161 | 0.051 | 280 |

Non high melt strength grades of polypropylene have foam temperature processing windows of less than 1° C.

Foamed examples 13 and 17 both has a fine closed cell structure.

EXAMPLES OF THERMOFORMING

The modified polypropylene produced in Example 69 was extruded on a Welex single screw extruder through a sheet die to produce a sheet 78 cm wide and ~1.25 mm thick. The sheet was fed to a Gabler F702 continuous thermoformer to produce margarine tubs. Tubs produced from the modified PP sample had a crush strength of 25 kg after 1 hour. No appreciable sag was noticed of the PP sheet during the process.

Blow Moulding

The modified polypropylene of Example 5 was blow moulded on Bekum blow moulder fitted with a general purpose polyolefin screw using a 750 ml screw top bottle mould, (radially non symmetrical bottle with waist). The mould temperature was 0° C.

The blow mouldability of the modified injection moulding grade of PP was compared against that of a commercial low melt flow index PP homopolymer (ICI GWM110 of MFI=1.5).

It was found that the modified PP homopolymer (MFI=9.1 and Melt Strength=6.9 cN) could be easily blow moulded into 750 ml bottles. Conventional PP of similar MFI could not be successfully blow moulded. The modified PP gave similar performance to an extrusion grade PP of low MFI.

The results are very promising where a higher MFI PP could be used to blow bottles. This possibly opens up the opportunity to produce large blow moulded parts through use of a high melt strength modified PP which has been tailored to have an MFI acceptable to blow moulding (ie 1–2 MFI).

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

What is claimed is:

1. A process for increasing the melt strength and/or the extensional melt viscosity of a polypropylene (co)polymer, the process comprising melt mixing a polypropylene (co)polymer in the presence of an initiator and optionally a monoene monomer wherein said initiator is selected from the group defined by formula 1:

Formula 1

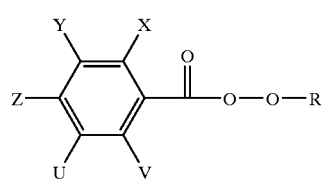

wherein R is selected from the group consisting of optionally substituted $C_1$ to $C_{18}$ acyl, optionally substituted $C_1$ to $C_{18}$ alkyl, aroyl defined by formula 2, Formula 2

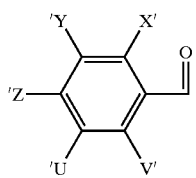

and groups of formula 3,

Formula 3

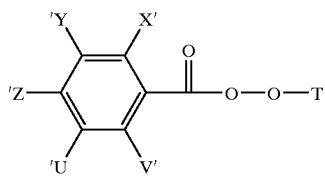

wherein U, V, X, Y, Z, U', V', X', Y' and Z' are independently selected from the group consisting hydrogen, halogen, C1–C18 alkyl, C1–C18 alkoxy, aryloxy, acyl, acyloxy, aryl, carboxy, alkoxycarbonyl, aryloxycarbonyl, trialkyl silyl, hydroxy, or a moiety of formula 4, Formula 4

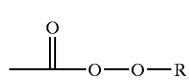

and wherein T is alkylene;
wherein the melt strength and/or the extensional melt viscosity of the polypropylene (co)polymer is increased during the melt mixing step.

2. The process according to claim 1 wherein the initiator is selected from compounds of formula 6.

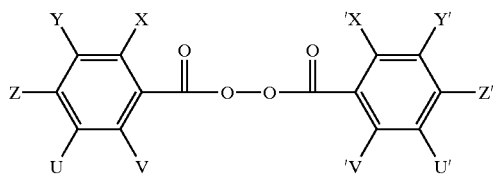

where X, Y, Z, U, V, X', Y', Z', U', V' are independently selected from the group consisting of hydrogen and $C_1$–$C_{18}$ alkyl where at least one of X, Y, Z, U, V and X', Y', Z', U', V' are not hydrogen.

3. The process according to claim 2 wherein the initiator is selected from the group consisting of Dibenzoyl peroxide, o,o'-Bis(methylbenzoyl) peroxide, p,p'-Bis(methylbenzoyl) peroxide, M,M'-Bis(methylbenzoyl) peroxide, o,m'-Bis(methylbenzoyl) peroxide, o,p'-Bis(methylbenzoyl) peroxide, m,p'-Bis(methylbenzoyl) peroxide, Bis (ethylbenzoyl) peroxide (all isomers), Bis(propylbenzoyl) peroxide (all isomers), Bis(butylbenzoyl) peroxide (all isomers), Bis(pentylbenzoyl) peroxide (all isomers), Bis (hexylbenzoyl) peroxide (all isomers), Bis(heptylbenzoyl) peroxide (all isomers), Bis(octylbenzoyl) peroxide (all isomers), Bis(nonylbenzoyl) peroxide (all isomers), Bis (methoxybenzoyl) peroxide (all isomers), Bis (ethoxybenzoyl) peroxide (all isomers), Bis (propoxybenzoyl) peroxide (all isomers), Bis (butoxybenzoyl) peroxide (all isomers), Bis (pentoxybenzoyl) peroxide (all isomers), Bis (hexyloxybenzoyl) peroxide (all isomers), Bis (heptyloxybenzoyl) peroxide (all isomers), Bis (octyloxybenzoyl) peroxide (all isomers), Bis (nonyloxybenzoyl) peroxide (all isomers), Bis (chlorobenzoyl) peroxide (all isomers), Bis(fluorobenzoyl) peroxide (all isomers), Bis(bromobenzoyl) peroxide (all isomers), Bis(dimethylbenzoyl) peroxide (all isomers), Bis (trimethylbenzoyl) peroxide (all isomers), Bis(tert-butylbenzoyl)peroxide (all isomers), Bis(di-tert-butylbenzoyl)peroxide (all isomers), Bis(tertbutoxybenzoyl) peroxide (all isomers), Bis(ditrimethylsilylbenzoyl) peroxide (all isomers), Bis(heptafluoropropylbenzoyl) peroxide (all isomers), Bis(2,6-dimethyl-4-trimethylsilyl benzoyl) peroxide and isomers, 2,2'(dioxydicarbonyl) bis— Benzoic acid dibutyl ester where the term "all isomers" refers to any variation in the position of the ring substituent as well as the structure of the substituent itself.

4. The process according to claim 1 wherein the initiator is selected from the group consisting of tert-butyl perbenzoate, tert-butyl (methyl)perbenzoate (all isomers), tert-butyl (ethyl)perbenzoate (all isomers), tert-butyl (octyl) perbenzoate (all isomers), tert-butyl (nonyl)perbenzoate (all isomers), tert-amyl perbenzoate, tert-amyl (methyl) perbenzoate (all isomers), tert-amyl (ethyl)perbenzoate (all isomers), tert-amyl (octyl)perbenzoate (all isomers), tert-amyl (nonyl)perbenzoate (all isomers), tert-amyl (methoxy) perbenzoate (all isomers), tert-amyl (octyloxy)perbenzoate (all isomers), tert-amyl (nonyloxy)perbenzoate (all isomers), 2-ethylhexyl perbenzoate, 2-ethylhexyl (methyl) perbenzoate (all isomers), 2-ethylhexyl (ethyl)perbenzoate (all isomers), 2-ethylhexyl (octyl)perbenzoate (all isomers), 2-ethylhexyl (nonyl)perbenzoate (all isomers), 2-ethylhexyl (methoxy)perbenzoate (all isomers), 2-ethylhexyl (ethoxy) perbenzoate (all isomers), 2-ethylhexyl (octyloxy) perbenzoate (all isomers), and 2-ethylhexyl (nonyloxy) perbenzoate (all isomers).

5. The process according to claim 1 wherein the initiator is selected from the group consisting of Bis (tertbutylmonoperoxy phthaloyl) diperoxy terephthalate, Bis (tertamylmonoperoxy phthaloyl) diperoxy terephthalate diacetyl phthaloyl diperoxide, dibenzoyl phthaloyl diperoxide, bis(4 methylbenzoyl) phthaloyl diperoxide, diacetyl terephthaloyl di peroxide, dibenzoyl terephthaloyl diperoxide, and Poly[dioxycarbonyldioxy(1,1,4,4-tetramethyl-1,4-butanediyl)] peroxide.

6. The process according to claim 1 wherein the initiator has a 0.1 hour half life in the range 100–170° C.

7. The process according to claim 1 wherein the initiator is present in a range of from 0.004 to 0.25 moles of initiator per kg of the polypropylene homopolymer or copolymer.

8. The process according to claim 7 wherein the initiator is present in the range of from 0.006 to 0.10 moles of initiator per kg of the polypropylene homopolymer or copolymer.

9. The process according to claim 8 wherein the initiator is present in the range of from 0.01 to 0.05 moles of initiator per kg of the polypropylene homopolymer or copolymer.

10. The process according to claim 1 wherein there is no added monoene monomer and the initiator is selected from the group consisting of Dibenzoyl peroxide, o,o'-Bis (methylbenzoyl) peroxide, p,p'-Bis(methylbenzoyl) peroxide, o,o'-Bis(methylbenzoyl) peroxide, o,m'-Bis (methylbenzoyl) peroxide, o,p'-Bis(methylbenzoyl) peroxide, m,p'-Bis(methylbenzoyl) peroxide, Bis (ethylbenzoyl) peroxide (all isomers), Bis(propylbenzoyl) peroxide (all isomers), Bis(butylbenzoyl) peroxide (all isomers), Bis(pentylbenzoyl) peroxide (all isomers), Bis (hexylbenzoyl) peroxide (all isomers), Bis(heptylbenzoyl) peroxide (all isomers), Bis(octylbenzoyl) peroxide (all isomers), Bis(nonylbenzoyl) peroxide (all isomers), Bis (methoxybenzoyl) peroxide (all isomers), Bis (ethoxybenzoyl) peroxide (all isomers), Bis (propoxybenzoyl) peroxide (all isomers), Bis (butoxybenzoyl) peroxide (all isomers), Bis (pentoxybenzoyl) peroxide (all isomers), Bis (hexyloxybenzoyl) peroxide (all isomers), Bis (heptyloxybenzoyl) peroxide (all isomers), Bis (octyloxybenzoyl) peroxide (all isomers), Bis (nonyloxybenzoyl) peroxide (all isomers), Bis (chlorobenzoyl) peroxide (all isomers), Bis(fluorobenzoyl) peroxide (all isomers), Bis(bromobenzoyl) peroxide (all isomers), Bis(dimethylbenzoyl) peroxide (all isomers), Bis (trimethylbenzoyl) peroxide (all isomers), Bis(tert-butylbenzoyl)peroxide (all isomers), Bis(di-tert-butylbenzoyl)peroxide (all isomers), Bis(tertbutoxybenzoyl) peroxide (all isomers), Bis(ditrimethylsilylbenzoyl) peroxide (all isomers), Bis(heptafluoropropylbenzoyl) peroxide (all isomers), Bis(2,4-dimethyl-6-trimethylsilyl benzoyl) peroxide and isomers tert-amyl perbenzoate, tert-amyl (methyl)perbenzoate (all isomers), tert-amyl (ethyl) perbenzoate (all isomers), tert-amyl (octyl)perbenzoate (all isomers), tert-amyl (nonyl)perbenzoate (all isomers), tert-amyl (methoxy)perbenzoate (all isomers), tert-amyl (octyloxy)perbenzoate (all isomers), tert-amyl (nonyloxy) perbenzoate (all isomers), Bis(tertamylmonoperoxy phthaloyl) diperoxy terephthalate, diacetyl phthaloyl diperoxide, dibenzoyl phthaloyl diperoxide, bis(4-methylbenzoyl) phthaloyl diperoxide, diacetyl terephthaloyl di peroxide and dibenzoyl terephthaloyl diperoxide.

11. The process according to claim 10 wherein the initiator is selected from the group consisting of dibenzoyl peroxide, o,o'-Bis(methylbenzoyl) peroxide, p,p'-Bis(methylbenzoyl) peroxide, M,M'-Bis(methylbenzoyl) peroxide, o,m'-Bis(methylbenzoyl) peroxide, o,p'-Bis(methylbenzoyl) peroxide, and m,p'-Bis(methylbenzoyl) peroxide.

12. The process according to claim 1 wherein the initiator is used in combination with a monoene monomer.

13. The process according to claim 12 wherein the amount of monoene monomer is up to 5 times the total moles of initiator.

14. The process according to claim 12 wherein the monoene monomer is styrene.

15. The process according to claim 12 wherein the initiator is selected from the group consisting of Dibenzoyl peroxide, o,o'-Bis(methylbenzoyl) peroxide, p,p'-Bis(methylbenzoyl) peroxide, M,M'-Bis(methylbenzoyl) peroxide, o,m'-Bis(methylbenzoyl) peroxide, o,p'-Bis(methylbenzoyl) peroxide, m,p'-Bis(methylbenzoyl) peroxide, Bis(ethylbenzoyl) peroxide (all isomers), Bis (propylbenzoyl) peroxide (all isomers), Bis(butylbenzoyl) peroxide (all isomers), Bis(pentylbenzoyl) peroxide (all isomers), Bis(hexylbenzoyl) peroxide (all isomers), Bis (heptylbenzoyl) peroxide (all isomers), Bis(octylbenzoyl) peroxide (all isomers), Bis(nonylbenzoyl) peroxide (all isomers), Bis(methoxybenzoyl) peroxide (all isomers), Bis (ethoxybenzoyl) peroxide (all isomers), Bis (propoxybenzoyl) peroxide (all isomers), Bis (butoxybenzoyl) peroxide (all isomers), Bis (pentoxybenzoyl) peroxide (all isomers), Bis (hexyloxybenzoyl) peroxide (all isomers), Bis (heptyloxybenzoyl) peroxide (all isomers), Bis (octyloxybenzoyl) peroxide (all isomers), Bis (nonyloxybenzoyl) peroxide (all isomers), Bis (chlorobenzoyl) peroxide (all isomers), Bis(fluorobenzoyl) peroxide (all isomers), Bis(bromobenzoyl) peroxide (all isomers), Bis(dimethylbenzoyl) peroxide (all isomers), Bis (trimethylbenzoyl) peroxide (all isomers), Bis(tert-butylbenzoyl)peroxide (all isomers), Bis(di-tert-butylbenzoyl)peroxide (all isomers), Bis(tert-butoxybenzoyl)peroxide (all isomers), Bis (ditrimethylsilylbenzoyl) peroxide (all isomers), Bis (heptafluoropropylbenzoyl) peroxide(all isomers), Bis(2,4-dimethyl-6-trimethylsilyl benzoyl) peroxide and isomers, 2,2'(dioxydicarbonyl) bis—Benzoic acid dibutyl ester, tert-butyl perbenzoate, tert-butyl (methyl)perbenzoate (all isomers), tert-butyl (ethyl)perbenzoate (all isomers), tert-butyl (octyl)perbenzoate (all isomers), tert-butyl (nonyl) perbenzoate (all isomers), tert-amyl perbenzoate, tert-amyl (methyl)perbenzoate (all isomers), tert-amyl (ethyl) perbenzoate (all isomers), tert-amyl (octyl)perbenzoate (all isomers), tert-amyl (nonyl)perbenzoate (all isomers), tert-amyl (methoxy)perbenzoate (all isomers), tert-amyl (octyloxy)perbenzoate (all isomers), tert-amyl (nonyloxy) perbenzoate (all isomers), 2-ethylhexyl perbenzoate, 2-ethylhexyl (methyl)perbenzoate (all isomers), 2-ethylhexyl (ethyl)perbenzoate (all isomers), 2-ethylhexyl (octyl)perbenzoate (all isomers), 2-ethylhexyl (nonyl) perbenzoate (all isomers), 2-ethylhexyl (methoxy) perbenzoate (all isomers), 2-ethylhexyl (ethoxy)perbenzoate (all isomers), 2-ethylhexyl (octyloxy)perbenzoate (all isomers), 2-ethylhexyl (nonyloxy)perbenzoate (all isomers), Bis(tertbutylmonoperoxy phthaloyl) diperoxy terephthalate, Bis(tertamylmonoperoxy phthaloyl) diperoxy terephthalate diacetyl phthaloyl diperoxide, dibenzoyl phthaloyl diperoxide, bis(4 methylbenzoyl) phthaloyl diperoxide, diacetyl terephthaloyl di peroxide, dibenzoyl terephthaloyl diperoxide and Poly[dioxycarbonyldioxy(1,1,4,4-tetramethyl-1,4-butanediyl)] peroxide.

16. A modified polypropylene produced according to claim 1.

17. A process wherein the modified polypropylene of claim 16 is melt mixed with an unmodified polypropylene to produce a modified polypropylene.

18. A process for modifying an α-olefin polymer wherein said process comprises melt mixing the α-olefin polymer in the presence of an initiator and optionally a monoene monomer wherein said initiator is selected from the group defined by formula 1;

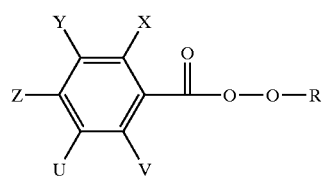

Formula 1 wherein R is selected from the group consisting of optionally substituted $C_1$ to $C_{18}$ acyl, optionally substituted $C_1$ to $C_{18}$ alkyl, aroyl defined by formula 2,

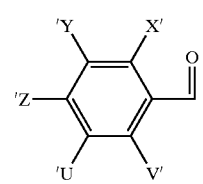

Formula 2 and groups of formula 3,

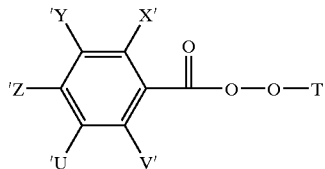

Formula 3 wherein U, V, X, Z, U', V', X', Y' and Z' are independently selected from the group consisting hydrogen, halogen, C1–C18 alkyl, C1–C18 alkoxy, aryloxy, acyl, acyloxy, aryl, carboxy, alkoxycarbonyl, aryloxycarbonyl, trialkyl silyl, hydroxy, or a moiety of formula 4,

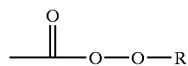

and wherein T is alkylene;
and wherein the amount of monomer is 0 to 3 times the total moles of initiator.

19. A process for increasing the melt strength and/or the extensional melt viscosity of a polypropylene (co)polymer, the process comprising melt mixing a polypropylene (co)polymer in the presence of an initiator and styrene wherein said initiator is selected from the group defined by formula 1:

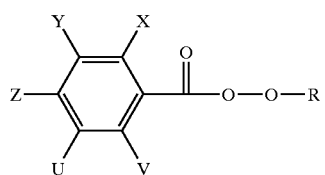

Formula 1 wherein R is selected from the group consisting of optionally substituted $C_1$ to $C_{18}$ acyl, optionally substituted $C_1$ to $C_{18}$ alkyl, aroyl defined by formula 2,

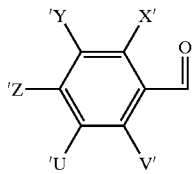

Formula 2 and groups of formula 3,

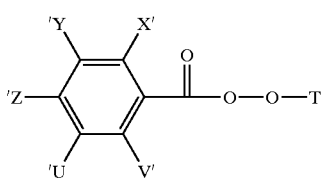

Formula 3 wherein U, V, X, Y, Z, U', V', X', Y' and Z' are independently selected from the group consisting hydrogen, halogen, C1–C18 alkyl, C1–C18 alkoxy, aryloxy, acyl, acyloxy, aryl, carboxy, alkoxycarbonyl, aryloxycarbonyl, trialkyl silyl, hydroxy, or a moiety of formula 4,

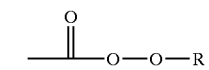

Formula 4 and wherein T is alkylene, and where styrene is up to five times the total moles of initiator;
wherein the melt strength and/or the extensional melt viscosity of the polypropylene (co)polymer is increased during the melt mixing step.

* * * * *

UNITED STATES PATENT AND TRADEMARK OFFICE
CERTIFICATE OF CORRECTION

PATENT NO.         : 6,951,904 B1
APPLICATION NO. : 09/600363
DATED                 : October 4, 2005
INVENTOR(S)       : Gary Peeters et al.

It is certified that error appears in the above-identified patent and that said Letters Patent is hereby corrected as shown below:

At col. 40, line 23, change "(nonyl)perbenzoate" to --(nonyloxy)perbenzoate--.

Signed and Sealed this

Twentieth Day of March, 2007

JON W. DUDAS
*Director of the United States Patent and Trademark Office*